US012599892B2

(12) United States Patent
Collias et al.

(10) Patent No.: US 12,599,892 B2
(45) Date of Patent: Apr. 14, 2026

(54) MICROPLASTIC REMOVAL USING ADHESIVES

(71) Applicants: The Procter & Gamble Company, Cincinnati, OH (US); The Regents of the University of Michigan, Ann Arbor, MI (US)

(72) Inventors: Dimitris Ioannis Collias, Mason, OH (US); Anne McNeil, Ann Arbor, MI (US); Paul Takunda Chazovachii, Ann Arbor, MI (US); Woojung Ji, Ann Arbor, MI (US)

(73) Assignees: The Procter & Gamble Company, Cincinnati, OH (US); The Regents of the University of Michigan, Ann Arbor, MI (US)

( * ) Notice: Subject to any disclaimer, the term of this patent is extended or adjusted under 35 U.S.C. 154(b) by 568 days.

(21) Appl. No.: 18/070,525

(22) Filed: Nov. 29, 2022

(65) Prior Publication Data

US 2023/0234028 A1 Jul. 27, 2023

Related U.S. Application Data

(63) Continuation of application No. PCT/US2021/039645, filed on Jun. 29, 2021.

(Continued)

(51) Int. Cl.

*B01J 20/26* (2006.01)
*B01D 53/04* (2006.01)

(Continued)

(52) U.S. Cl.

CPC ........ *B01J 20/265* (2013.01); *B01D 53/0407* (2013.01); *B01J 20/28028* (2013.01);

(Continued)

(58) Field of Classification Search

CPC ......................... B01J 20/265; B01J 20/28028; B01J 20/3085; B01D 53/0407; B01D 2253/34;

(Continued)

(56) References Cited

U.S. PATENT DOCUMENTS 3,677,788 A 7/1972 Zirnite
5,508,313 A 4/1996 Delgado (Continued)

FOREIGN PATENT DOCUMENTS

CN 101781535 A 7/2010
CN 110237821 A 9/2019

(Continued)

OTHER PUBLICATIONS

Huang, Sensors and Actuators B 222 (2016) 106-111 (Year: 2016).*

(Continued)

*Primary Examiner* — Robert C Boyle
(74) *Attorney, Agent, or Firm* — Kathleen Y. Carter; James E. Oehlenschlager

(57) ABSTRACT

Articles comprising pressure-sensitive adhesives and methods of their use for removing micro- and nanoplastic particles from various media, including wastewater effluent, laundry effluent, and indoor air, are disclosed.

9 Claims, 23 Drawing Sheets

Related U.S. Application Data

(60) Provisional application No. 63/045,655, filed on Jun. 29, 2020.

(51) Int. Cl.

| | |
|---|---|
| ***B01J 20/28*** | (2006.01) |
| ***B01J 20/30*** | (2006.01) |
| ***C02F 1/28*** | (2023.01) |
| ***C08F 20/06*** | (2006.01) |
| ***C08J 11/28*** | (2006.01) |
| *C02F 101/32* | (2006.01) |
| *C02F 101/34* | (2006.01) |
| *C02F 101/38* | (2006.01) |
| *C02F 103/00* | (2006.01) |

(52) U.S. Cl.

CPC ........... *B01J 20/3085* (2013.01); *C02F 1/285* (2013.01); *C08F 20/06* (2013.01); *C08J 11/28* (2013.01); *B01D 2253/202* (2013.01); *B01D 2253/34* (2013.01); *B01D 2257/40* (2013.01); *B01D 2257/7022* (2013.01); *B01D 2259/4508* (2013.01); *C02F 2101/32* (2013.01); *C02F 2101/34* (2013.01); *C02F 2101/38* (2013.01); *C02F 2103/002* (2013.01); *C02F 2303/16* (2013.01); *C02F 2307/12* (2013.01); *C08F 2810/00* (2013.01); *C08J 2333/02* (2013.01)

(58) Field of Classification Search

CPC ........ B01D 2257/40; B01D 2257/7022; B01D 2259/4508; B01D 2253/202; C02F 1/285; C02F 2101/32; C02F 2307/12; C02F 2101/38; C02F 2101/34; C02F 2103/002; C02F 2303/16; C08F 20/06; C08F 2810/00; C09J 2467/00; C09J 2203/358; C09J 2301/302; C09J 2301/502; C09J 5/00; Y02W 10/37; C08J 2333/02; C08J 11/28

See application file for complete search history.

(56) References Cited

U.S. PATENT DOCUMENTS

| | | | | |
|---|---|---|---|---|
| 5,663,241 | A * | 9/1997 | Takamatsu | C09J 133/08 525/328.2 |
| 5,912,002 | A | 6/1999 | Grieveson et al. | |
| 6,095,996 | A | 8/2000 | Steer et al. | |
| 6,288,172 | B1 * | 9/2001 | Goetz | C09J 7/38 525/200 |
| 7,291,679 | B2 | 11/2007 | Maehara et al. | |
| 2003/0114621 | A1 | 6/2003 | Kasahara et al. | |
| 2005/0037144 | A1 | 2/2005 | Cesiro et al. | |
| 2005/0101208 | A1 | 5/2005 | Heider et al. | |
| 2010/0099781 | A1 | 4/2010 | Tian et al. | |
| 2010/0135936 | A1 | 6/2010 | Dueva-koganov et al. | |
| 2010/0204068 | A1 | 8/2010 | Kesavan et al. | |
| 2010/0322996 | A1 | 12/2010 | Wibaux et al. | |
| 2010/0330860 | A1 | 12/2010 | Puerkner et al. | |
| 2012/0302445 | A1 | 11/2012 | Rudolph et al. | |
| 2013/0089587 | A1 | 4/2013 | Staudigel et al. | |
| 2013/0108860 | A1 * | 5/2013 | Chen | C09J 7/10 977/773 |
| 2014/0230322 | A1 | 8/2014 | Zhang et al. | |
| 2015/0140052 | A1 | 5/2015 | Gizaw et al. | |
| 2020/0149220 | A1 | 5/2020 | Konishi et al. | |
| 2021/0054161 | A1 | 2/2021 | Collias et al. | |
| 2021/0054248 | A1 | 2/2021 | Collias et al. | |

FOREIGN PATENT DOCUMENTS

| | | | |
|---|---|---|---|
| EP | 0797644 | A1 | 10/1997 |
| EP | 3238840 | A1 | 11/2017 |
| JP | H09249711 | A | 9/1997 |
| KR | 20200035191 | A | 4/2020 |

OTHER PUBLICATIONS

EPO Search Report and Opinion for 21832336.8 dated Jan. 18, 2024, 8 pages.

Chazovachii et al., "Using Adhesives to Capture Microplastics from Water", ACS Publications, Oct. 19, 2021, pp. 1698-1704.

Francesca et al., The contribution of washing processes of synthetic clothes to microplastic pollution, Scientific Reports, Retrieved from Internet:https://www.nature.com/articles/s41598-019-43023-x, Apr. 29, 2019, 11 Pages.

Ebrahimi et al. "The study of ultrasonic degradation of superabsorbent Hydrogels", Organic Chemistry International, vol. 2012, Article ID 343768, Hindawi Publishing Corporation, Year 2012, 5 pages.

Ebrahimi, "Influence of ultrasonic parameters on the Degradation of Acrylic acid/ Acrylamide copolymers based supreabsorbent Hydrogels cross linked with NMBA", Iran polymer J, vol. 21, No. 1, Year 2012, pp. 11-20.

Final Office Action: U.S. Appl. No. 17/001,338, dated Jan. 22, 2024; 11 pages.

Final Office Action: U.S. Appl. No. 17/001,338, dated Mar. 31, 2023; 15 pages.

Non-Final Office Action: U.S. Appl. No. 17/001,338, dated Jan. 9, 2023; 17 pages.

Non-Final Office Action: U.S. Appl. No. 17/001,338, dated Sep. 20, 2023; 17 pages.

Non-Final Office Action: U.S. Appl. No. 17/001,345, dated Dec. 5, 2022; 7 pages.

Notice of Allowance: U.S. Appl. No. 17/001,338, dated Aug. 30, 2024; 9 pages.

Notice of Allowance: U.S. Appl. No. 17/001,345, dated Feb. 1, 2023; 8 pages.

Notice of Allowance: U.S. Appl. No. 17/001,345, dated Mar. 8, 2023; 7 pages.

* cited by examiner

MICROPLASTIC REMOVAL USING ADHESIVES

BACKGROUND

Microplastics have been found in locations as remote as the Arctic, Bergmann et al., 2019, and the deepest parts of the ocean, Peng et al., 2018, as well as in our food, Cox et al., 2019, and drinking water. Novotna et al., 2019. The environmental persistence of microplastics is due to the same characteristics that make plastics desirable (e.g., their inertness and durability). While efforts to remove large plastic items from the environment have been ongoing, led by regulations, buy-backs, and advances in science and engineering, comparatively little has been done to address microplastics pollution. Although recent legislation banned the deliberate addition of microplastics to certain products (e.g., facial scrubs and abrasives), such product's contribution to microplastic pollution was actually quite small. McDevitt et al., 2017.

Microplastics arise from many sources, including the physical degradation of existing plastic items in the environment. One of the biggest contributors to microplastic pollution, however, is from washing textiles. Belzagui et al., 2019; Yang et al., 2019. Microfibers of polyesters, polyamides and polyacrylates are released during laundry cycles in the so-called 'gray water' that is sent to wastewater treatment plants (WWTPs) and/or released directly into the environment. Hernandez et al., 2017. A polyester garment, for example, can generate over 1,900 microfibers/$m^2$ per wash during a single washing cycle, whereas an acetate-based garment can release approximately 75,000 microfibers/$m^2$ per wash. Yang et al., 2019. Approximately 840 million domestic washing machines exist across the globe, which combined generate around 20 $km^3$ of wastewater contaminated with microfibers per year. For most places within the U.S., this laundry effluent is sent to a WWTP. Recent studies have shown that U.S. wastewater treatment facilities are 90-98% effective at reducing the microplastic pollution in water. Xu et al., 2018.

The wastewater treatment process is surprisingly efficient at removing large plastic particles, Peller et al., 2019, based on screens and filters, as well as microplastics that co-precipitate with the other organics within sludge. Lo et al., 2019; Bayo et al., 2020. Even with this significant reduction, however, WWTP facilities in the U.S. are still releasing (on average) over 4 million microparticles per facility per day. Mason et al., 2016. The smaller suspended micro- and nanoplastics are not cleared, however, and are released into the watershed. A recent review of over 100 articles found that effluent and biosolids from wastewater treatment plants constitute the largest contributors of microplastics to the environment. Wong et al., 2020. In addition, the vast majority of the microplastics that are captured by the WWTP are co-located within a nutrient-rich sludge that is either incinerated, landfilled, or most often, sold for agricultural use. FIG. 1, Peller et al., 2019. The reuse of this sludge generates an endless cycle of environmental contamination, where the previously captured microplastics re-enter the watershed, and in many cases, the food chain.

SUMMARY

In some aspects, the presently disclosed subject matter provides a method for removing micro- or nanoplastic particles from a medium, the method comprising contacting the micro- or nanoplastic particles in the medium with an article comprising one or more pressure-sensitive adhesives, wherein the one or more pressure-sensitive adhesives comprise a compound of formula (I) or formula (II):

(I)

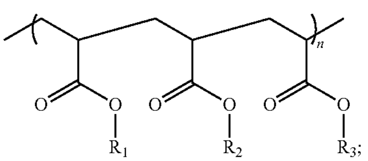

or (II)

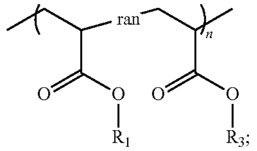

wherein:

each n is independently an integer from 1 to 10,000;

each $R_1$, $R_2$, and $R_3$, if present, is independently selected from the group consisting of:

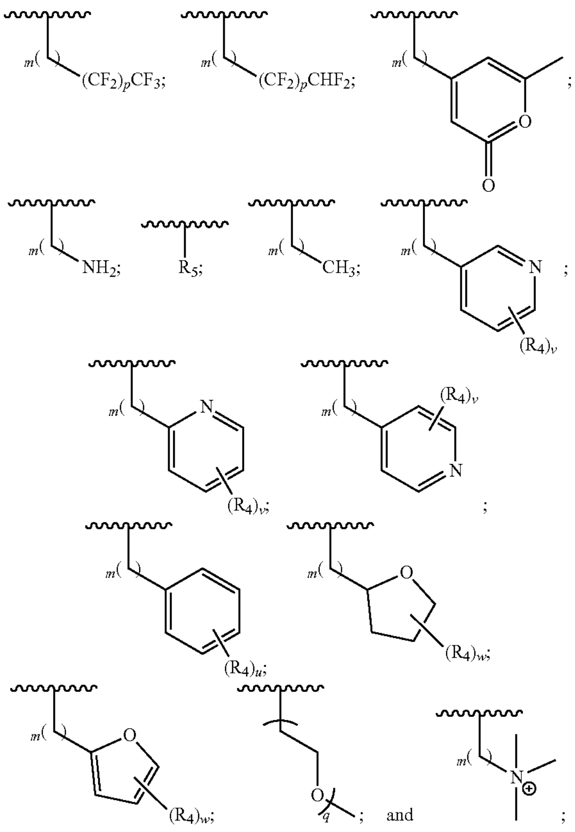

wherein: each m is independently an integer selected from the group consisting of 1, 2, 3, 4, 5, 6, 7, and 8; p and q are each independently an integer selected from the group consisting of 1, 2, 3, 4, 5, 6, 7, and 8; u is an integer selected from the group consisting of 1, 2, 3, 4, and 5; v is an integer selected from the group consisting of 1, 2, 3, and 4; w is an integer selected from the group consisting of 1, 2, and 3; each $R_4$ is independently selected from the group consisting of H, $C_1$-$C_8$ substituted or unsubstituted branched or straight-chain alkyl, hydroxyl, $C_1$-$C_8$ alkoxyl, amino, cyano, —$CF_3$, carbonyl, carboxyl, $C_1$-$C_8$ alkynyl, acyl, carbamoyl, halogen, nitro, mercapto, and thiol; and $R_5$ is a $C_3$-$C_{20}$ branched alkyl.

In certain aspects, $R_1$, $R_2$, and $R_3$, if present, are each independently selected from the group consisting of:

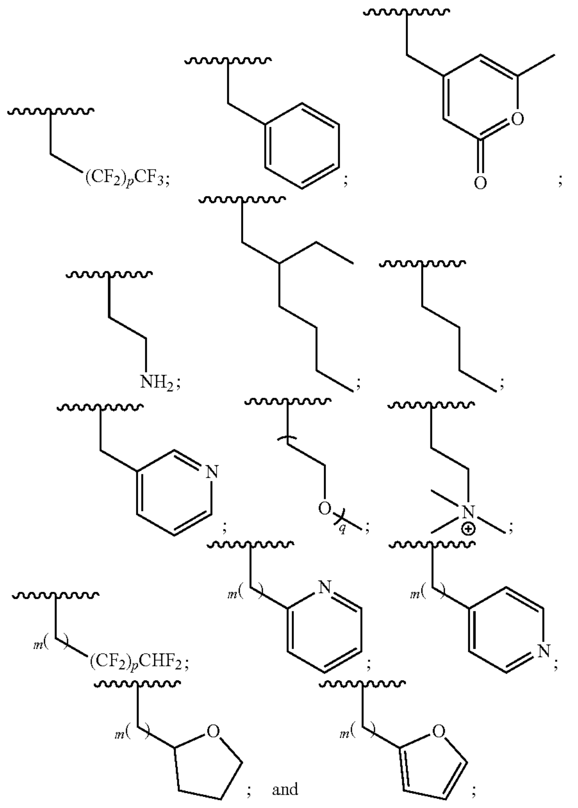

and wherein p and q are each independently integers selected from the group consisting of 1, 2, 3, 4, 5, 6, 7, and 8.

In certain aspects, the pressure sensitive adhesive is made from a recycled superabsorbent polymer (SAP). In particular aspects, the recycled SAP is degraded to poly(acrylic acid) (PAA); and wherein the PAA is derivatized to the pressure sensitive adhesive.

In particular aspects, the micro- or nanoplastic particles comprise a material selected from the group consisting of rubber, poly(isoprene), polyamide, polyester, poly(ethylene), poly(propylene), polystyrene, nylon, cellulose, poly (ethylene terephthalate), polyvinylfluoride (PVF), polyvinylidene fluoride (PVDF), poly(tetrafluoroethylene) (PTFE), polychlorotrifluoroethylene (PCTFE), perfluoroalkoxy alkane (PFA), fluorinated ethylene propylene (FEP), polyethylenetetrafluoroethylene (ETFE), polyethylenechlorotrifluoroethylene (ECTFE), perfluorinated elastomer (FFPM/FFKM), chlorotrifluoroethylenevinylidene fluoride (FPM/FKM), tetrafluoroethylene-propylene (FEPM), perfluoropolyether (PFPE), perfluorosulfonic acid (PFSA), perfluoropolyoxetane, and combinations thereof.

In certain aspects, the medium is selected from the group consisting of an aqueous medium and an atmospheric medium. In more certain aspects, the aqueous medium is selected from the group consisting of wastewater effluent from a wastewater treatment plant, laundry effluent from a commercial laundry facility, laundry effluent from a personal washing machine, and fill water in a washing machine during or after a washing cycle.

In certain aspects, the atmospheric environment is selected from the group consisting of indoor air, outdoor air, and the emissions, exhaust, and/or vent of a commercial or personal clothes dryer.

In other aspects, the method further comprising removing the micro- or nanoplastic particles from the one or more pressure-sensitive adhesives.

In some aspects, the presently disclosed subject matter provides an article comprising one or more pressure-sensitive adhesives, wherein the one or more pressure-sensitive adhesives comprise a compound of formula (I) or formula (II):

(I)

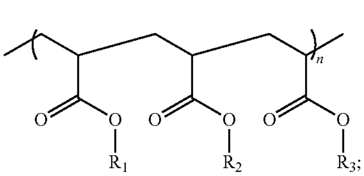

or (II)

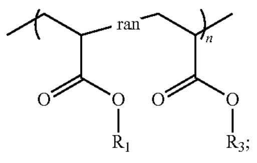

wherein:

each n is independently an integer from 1 to 10,000;

each $R_1$, $R_2$, and $R_3$, if present, is independently selected from the group consisting of:

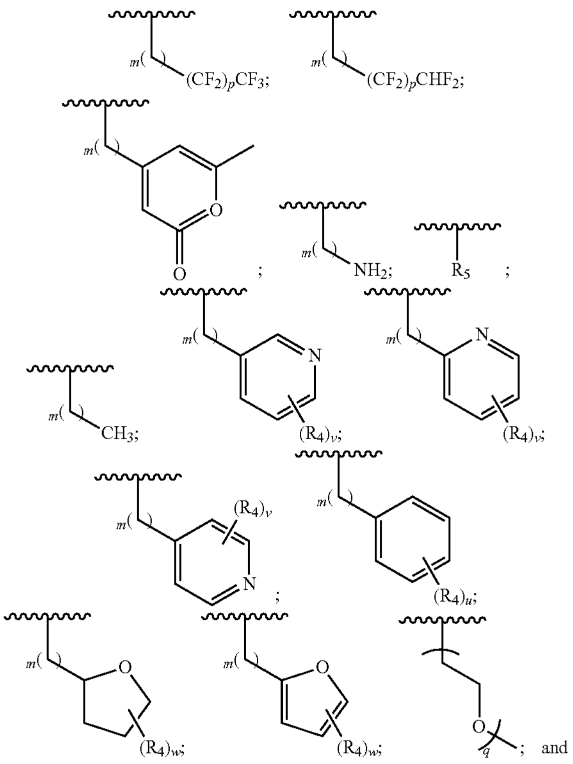

and

-continued

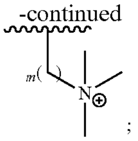

wherein: each m is independently an integer selected from the group consisting of 1, 2, 3, 4, 5, 6, 7, and 8; p and q are each independently an integer selected from the group consisting of 1, 2, 3, 4, 5, 6, 7, and 8; u is an integer selected from the group consisting of 1, 2, 3, 4, and 5; v is an integer selected from the group consisting of 1, 2, 3, and 4; w is an integer selected from the group consisting of 1, 2, and 3; each $R_4$ is independently selected from the group consisting of H, $C_1$-$C_8$ substituted or unsubstituted branched or straight-chain alkyl, hydroxyl, $C_1$-$C_8$ alkoxyl, amino, cyano, —$CF_3$, carbonyl, carboxyl, $C_1$-$C_8$ alkynyl, acyl, carbamoyl, halogen, nitro, mercapto, and thiol; and $R_5$ is a $C_3$-$C_{20}$ branched alkyl.

In certain aspects, $R_1$, $R_2$, and $R_3$ are each independently selected from the group consisting of:

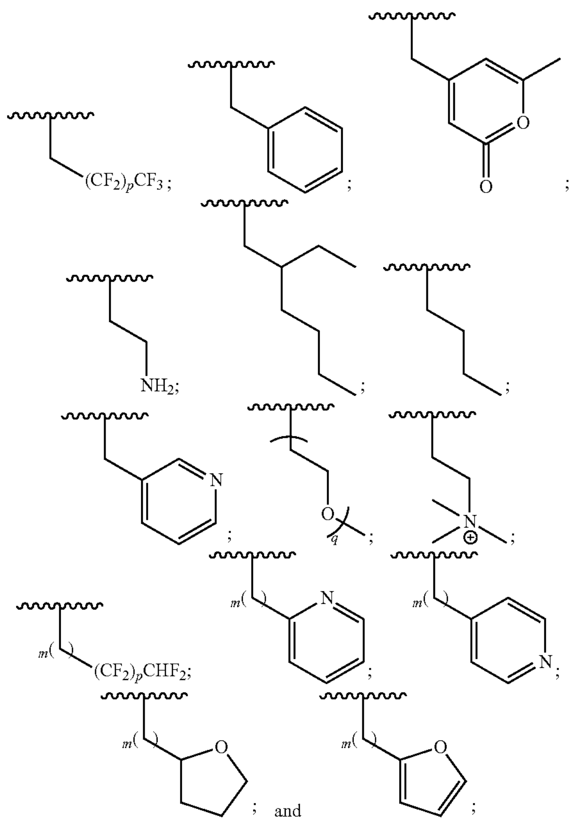

wherein p and q are each independently integers selected from the group consisting of 1, 2, 3, 4, 5, 6, 7, and 8.

In certain aspects, the article comprises a pressure sensitive adhesive that is made from a recycled superabsorbent polymer (SAP). In particular aspects, the recycled SAP is degraded to poly(acrylic acid) (PAA); and wherein the PAA is derivatized to the pressure sensitive adhesive.

In particular aspects, the article comprises a solid shape selected from the group consisting of a bar, brush, sphere, impeller, rectangular slide, prolate sphere, cube, pyramid, hexagon, octagon, and a combination thereof, wherein the solid shape can be closed or open. In more particular aspects, the shape further comprises protruding filaments coated with the one or more pressure-sensitive filaments.

In further aspects, the article is included in an air circulating system or device.

In yet further aspects, the presently disclosed subject matter provides a washing machine or clothes dryer comprising the presently disclosed article.

In other aspects, the presently disclosed subject matter provides a kit comprising the presently disclosed article.

Certain aspects of the presently disclosed subject matter having been stated hereinabove, which are addressed in whole or in part by the presently disclosed subject matter, other aspects will become evident as the description proceeds when taken in connection with the accompanying Examples and Drawings as best described herein below.

BRIEF DESCRIPTION OF THE DRAWINGS

Figure 1:
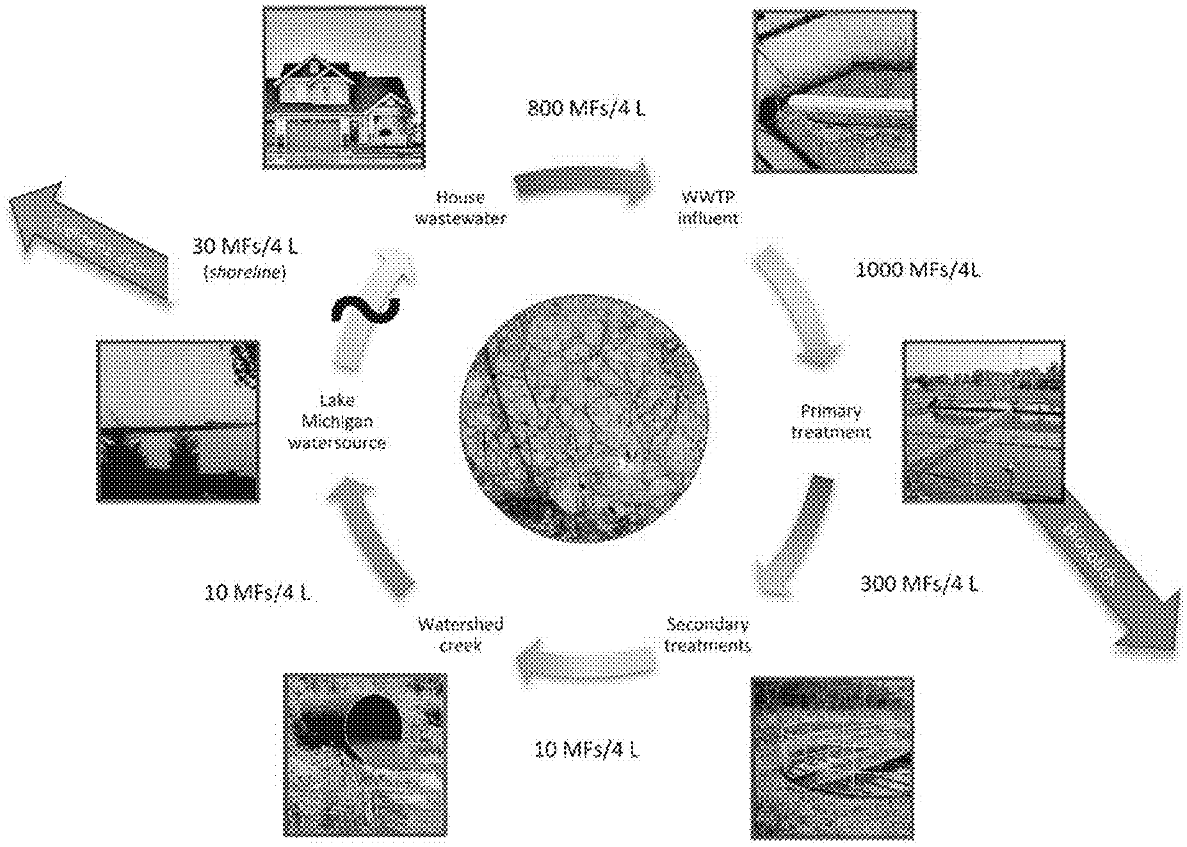
Figure 2:
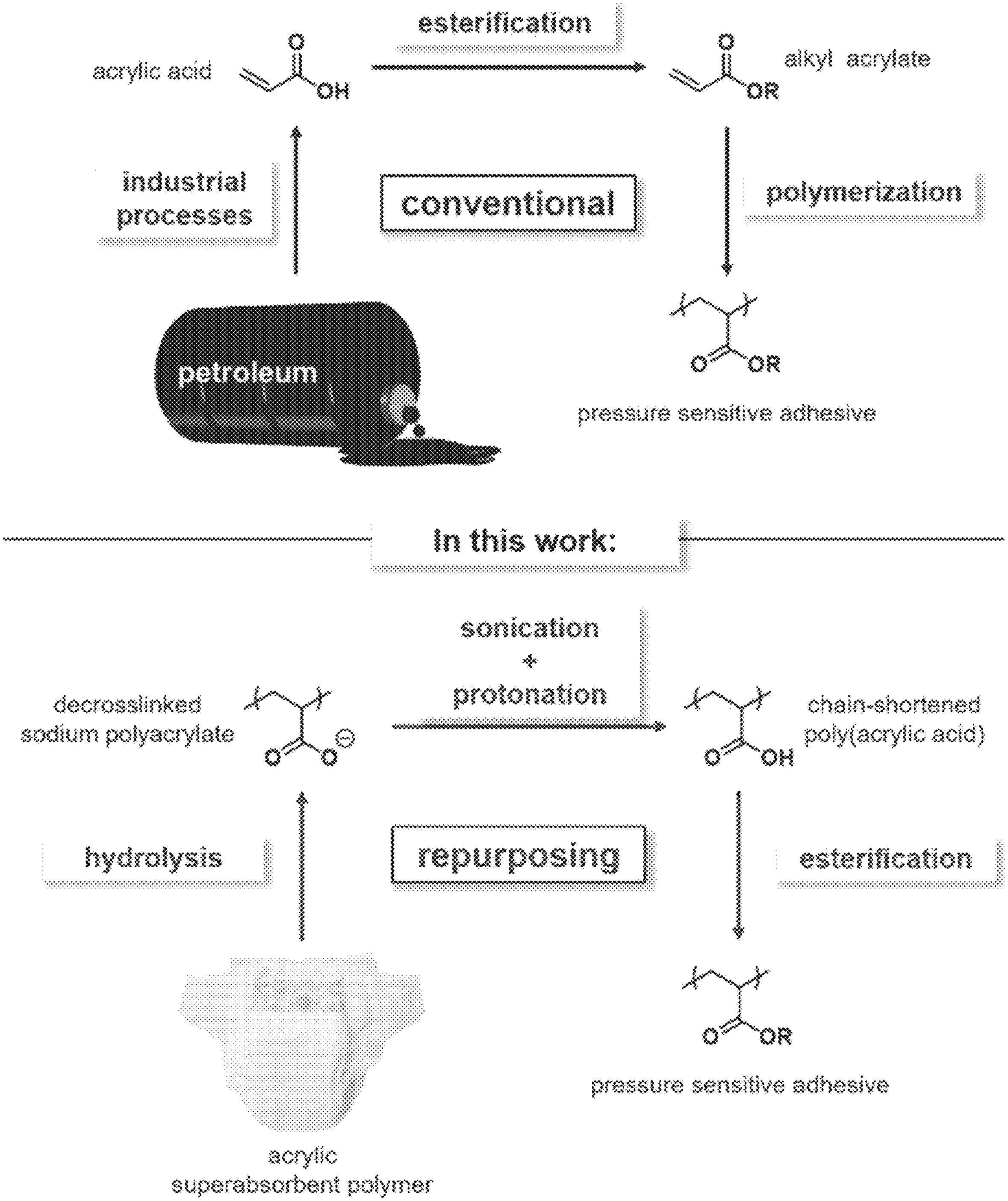
Figure 3:
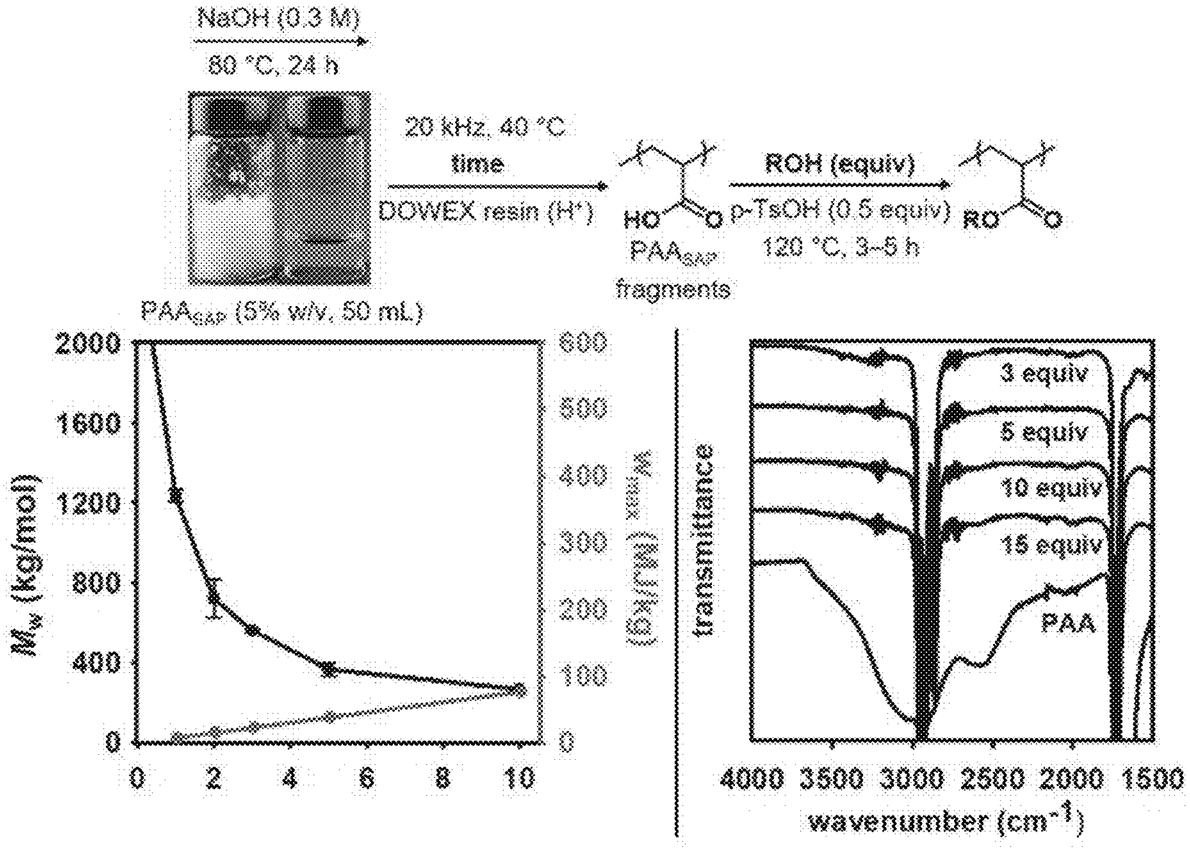
Figure 4:
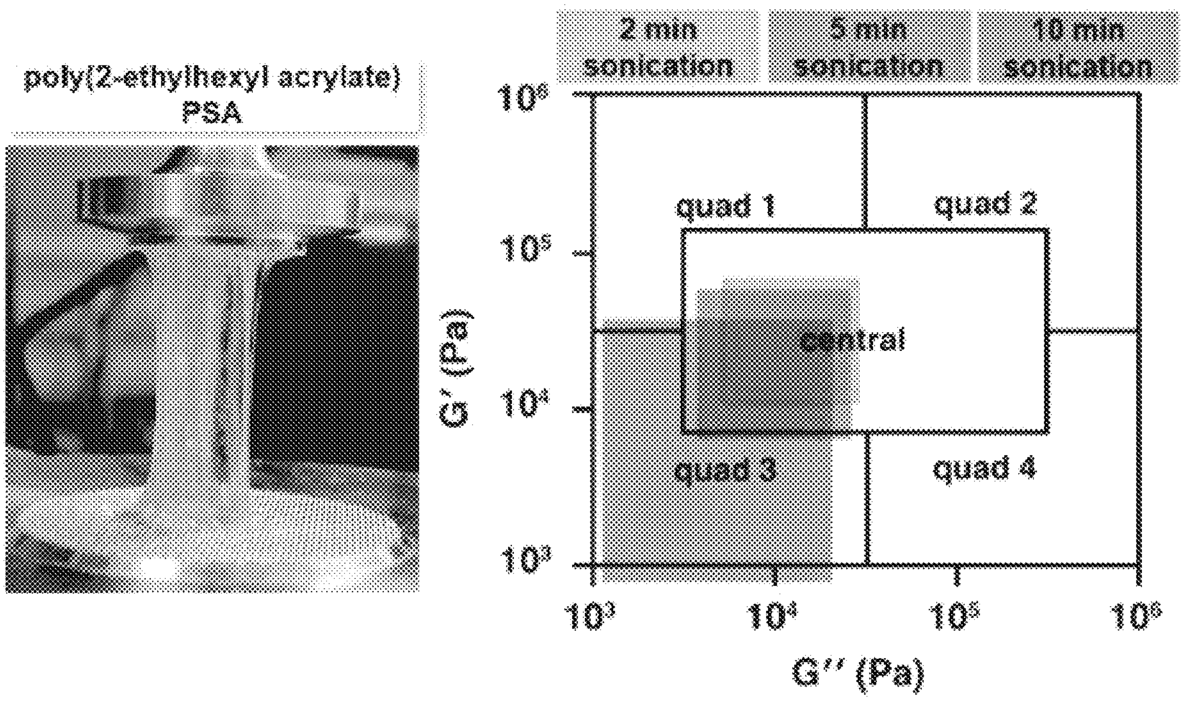
Figure 5:
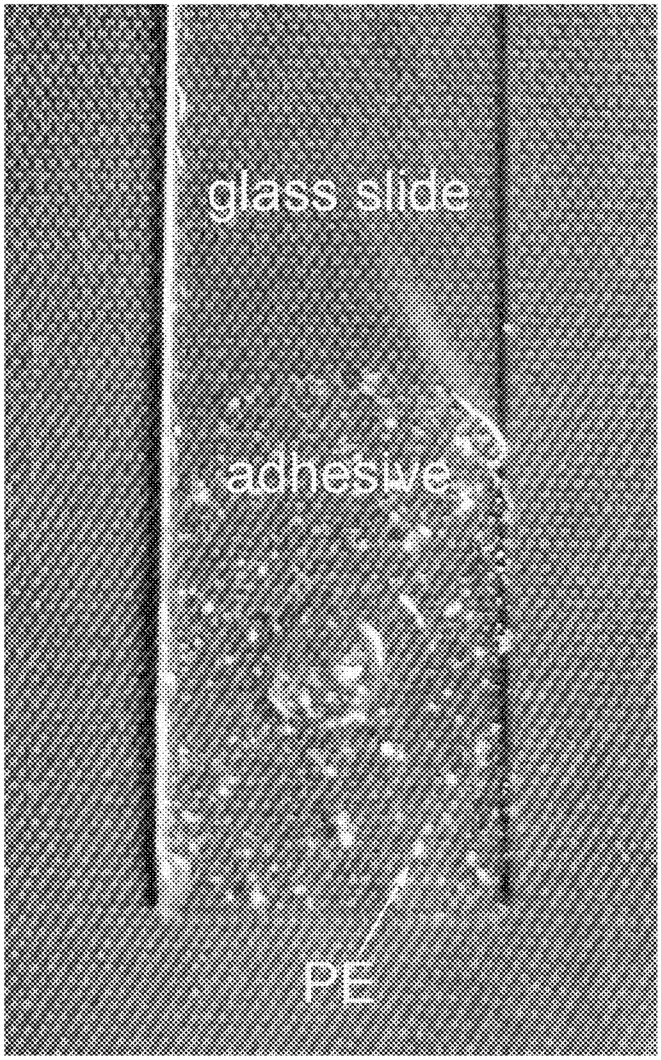
Figure 6:
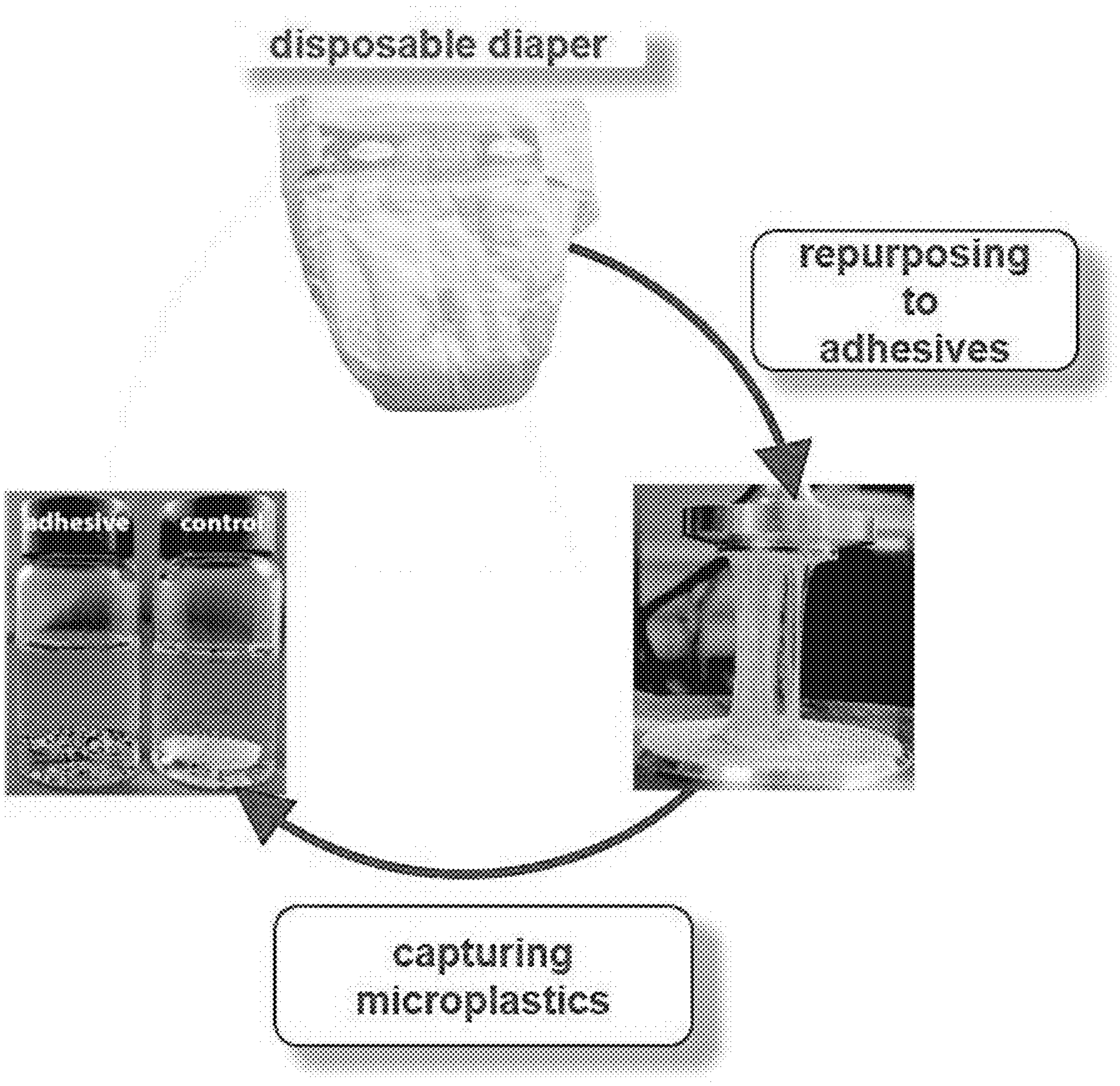
Figure 7:
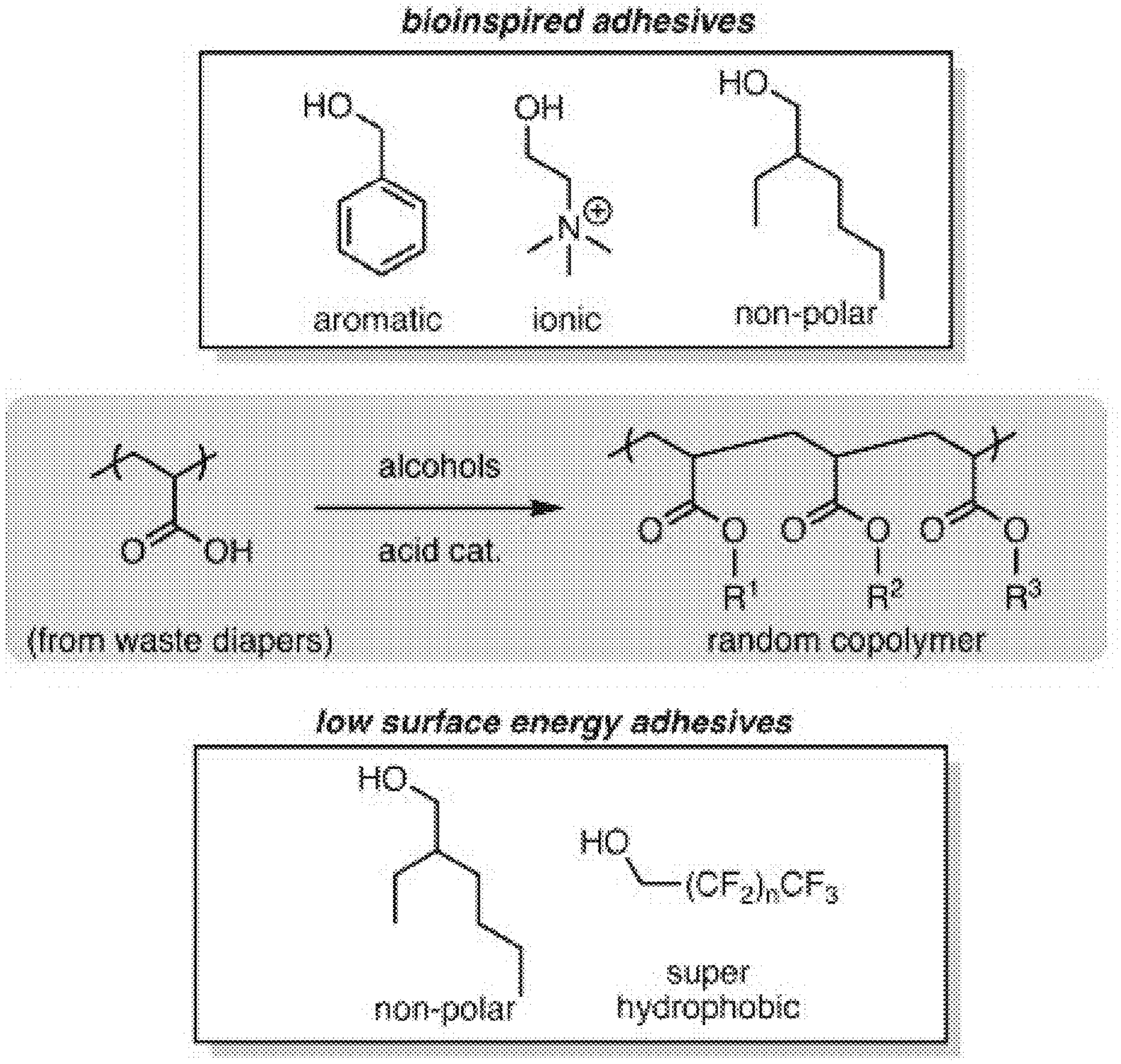
Figure 8:
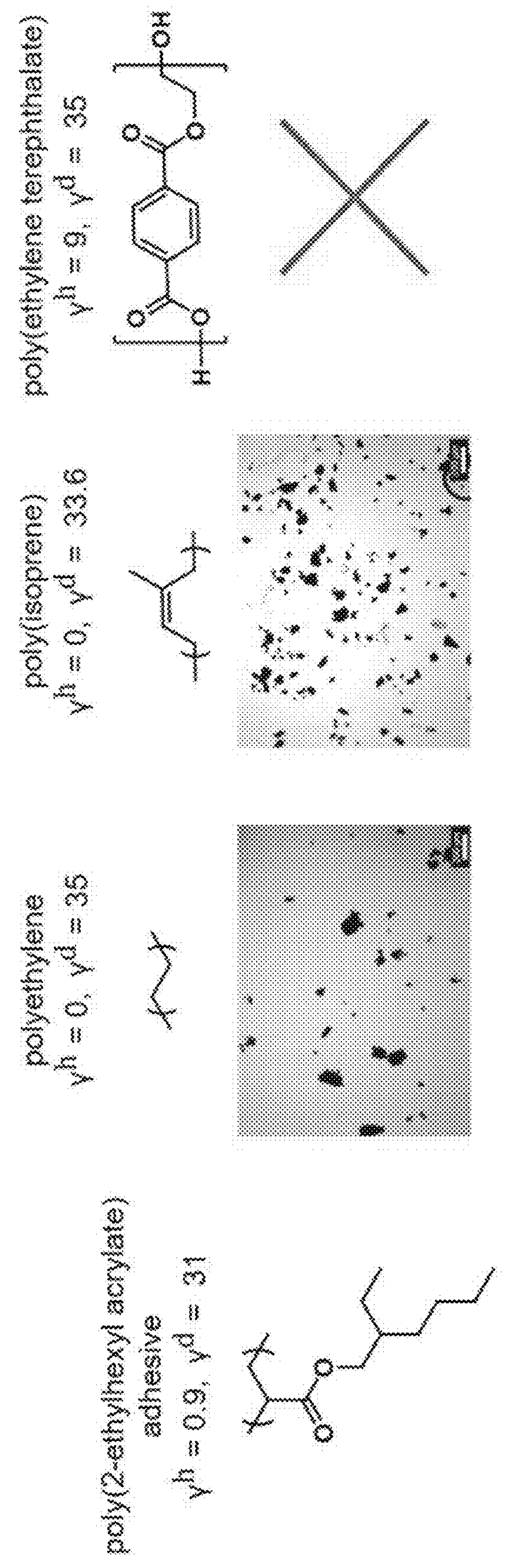
Figure 9:
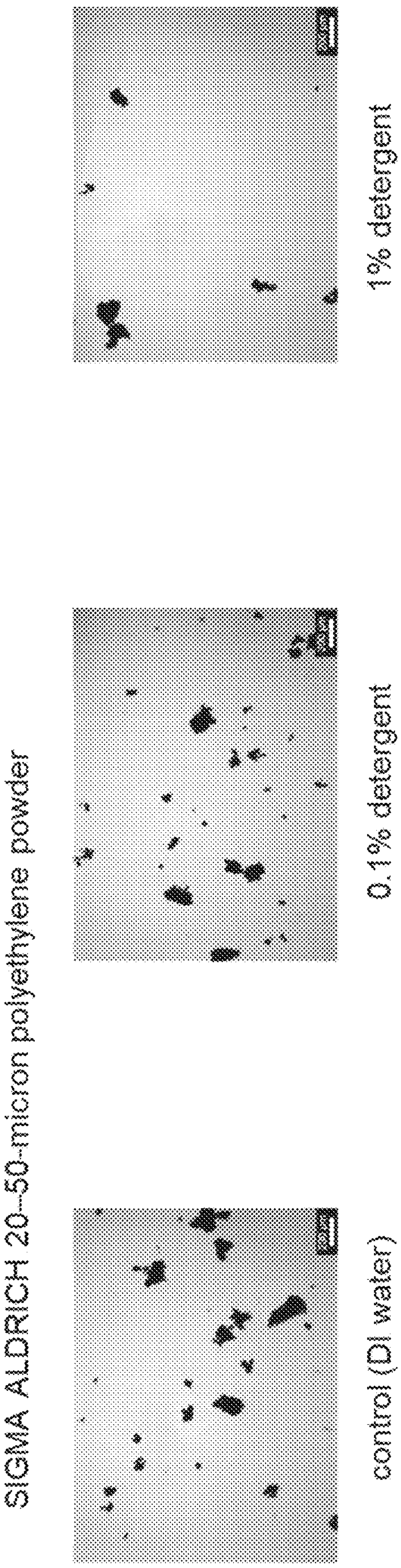
Figure 10:
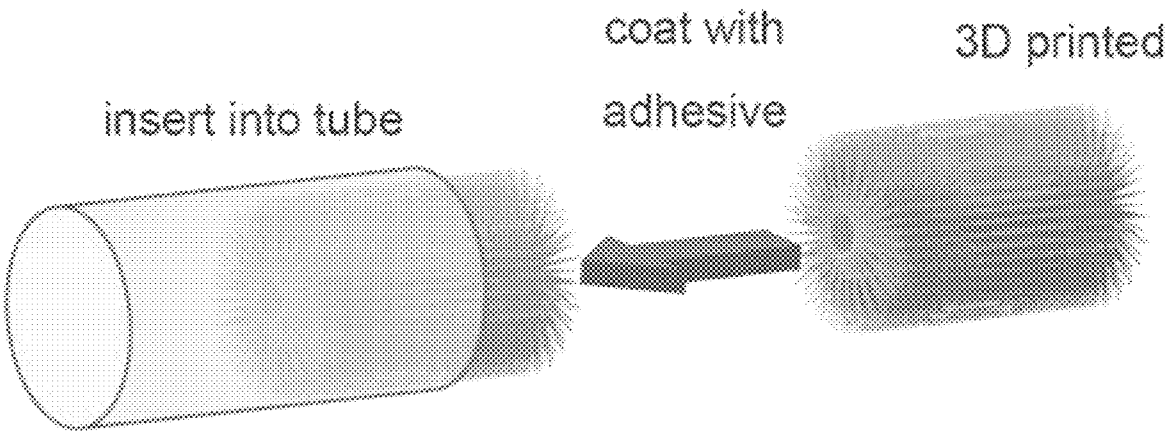
Figure 11A:
Figure 11B:
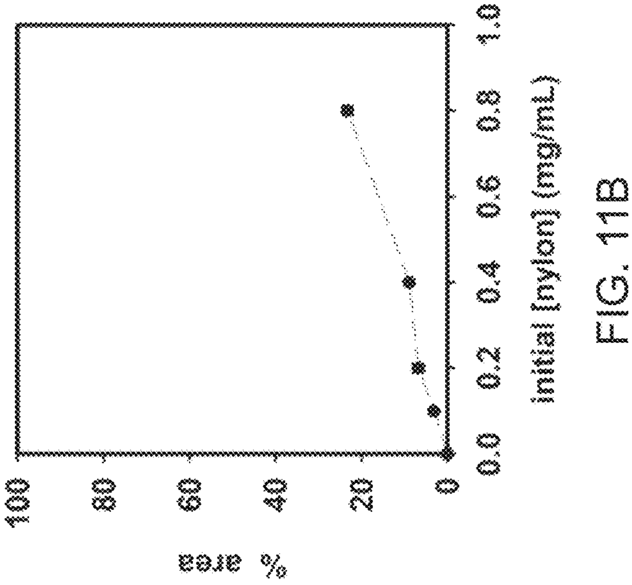
Figure 11C:
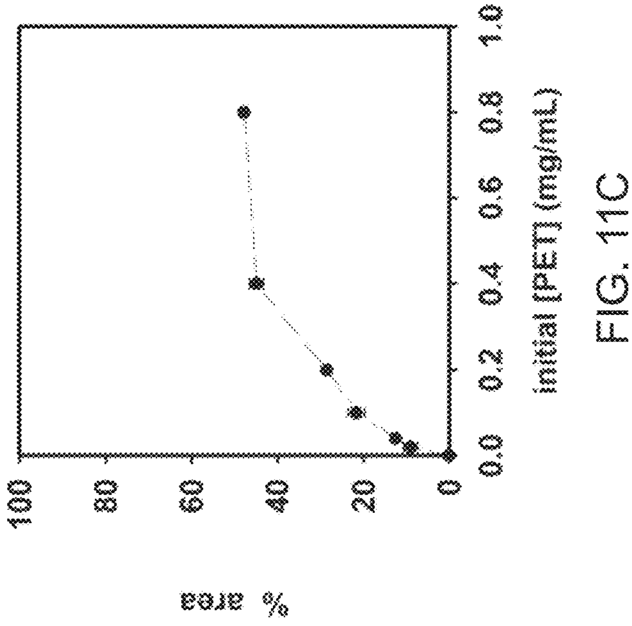
Figure 12A:
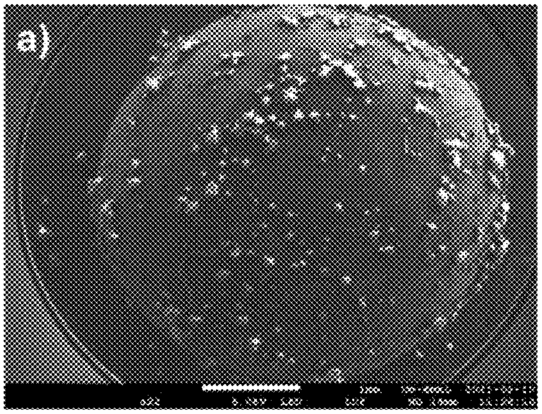
Figure 12B:
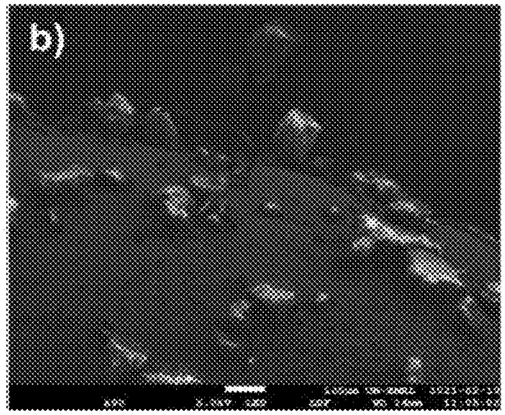
Figure 12C:
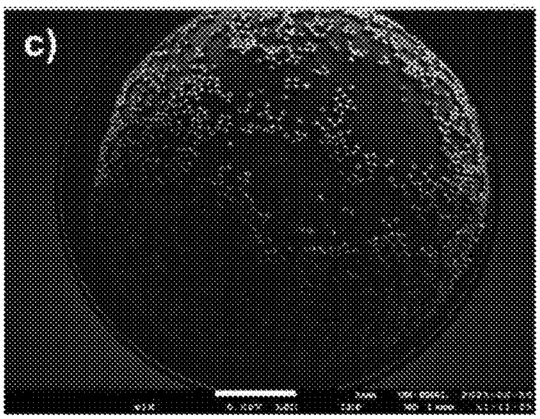
Figure 12D:
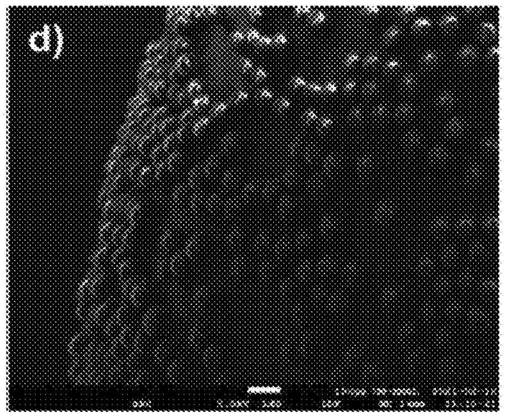
Figure 12O:
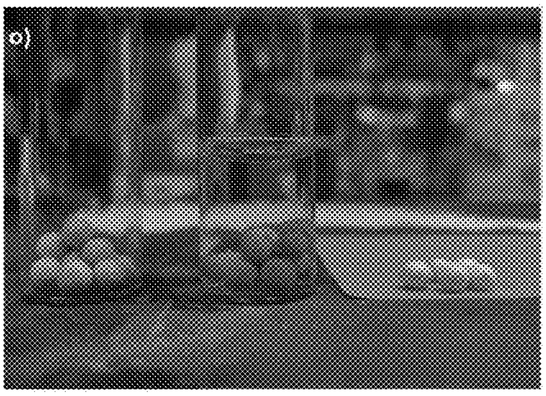
Figure 13:
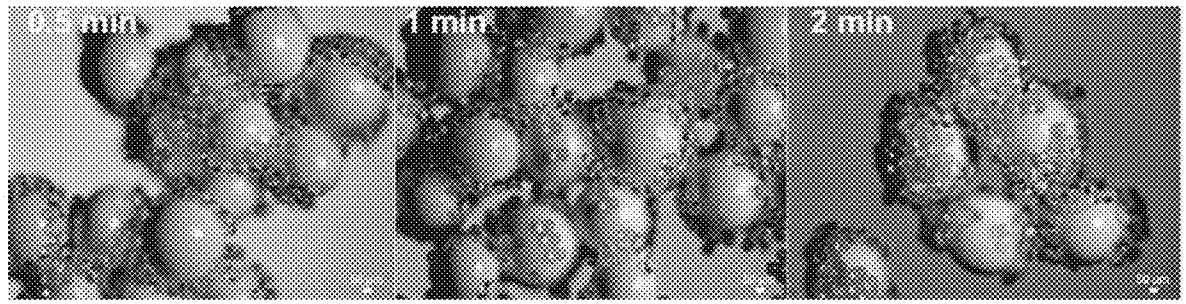
Figure 14A:
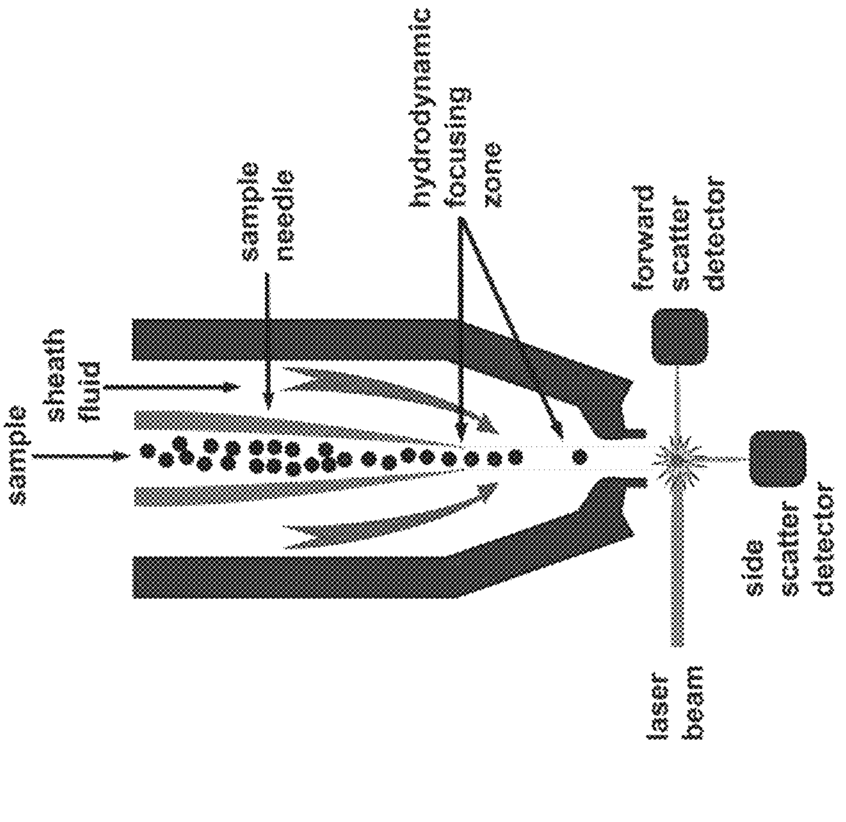
Figure 14B:
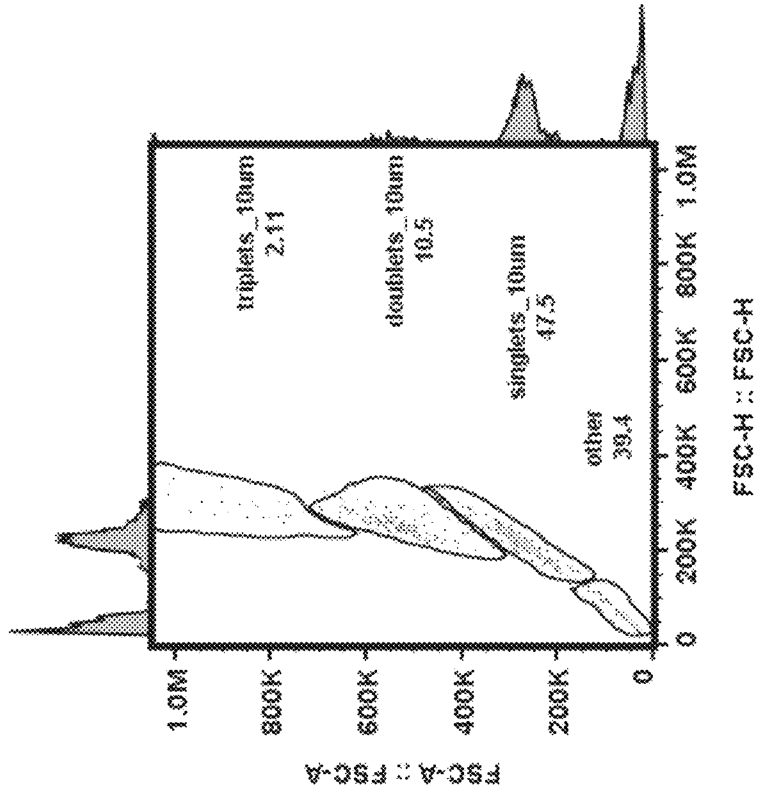
Figure 15A:
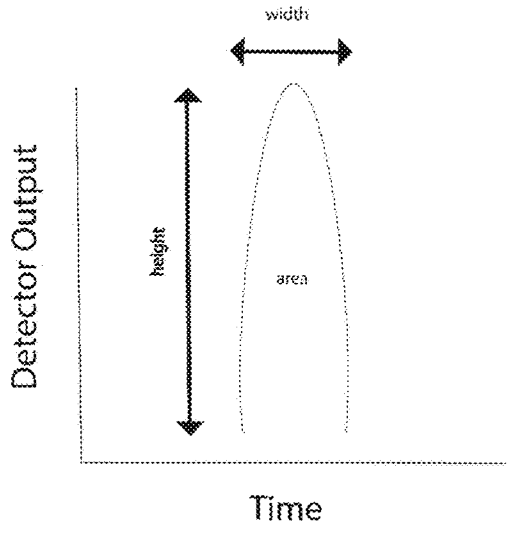
Figure 15B:
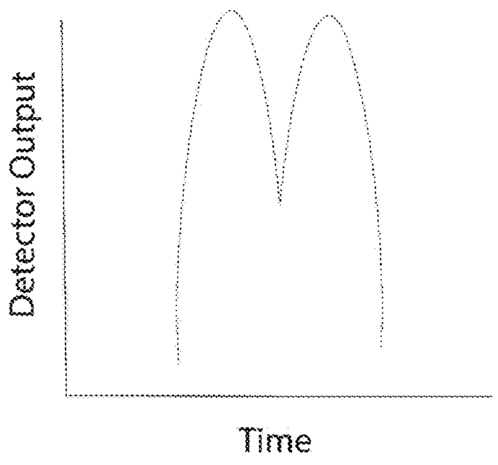
Figure 16B:
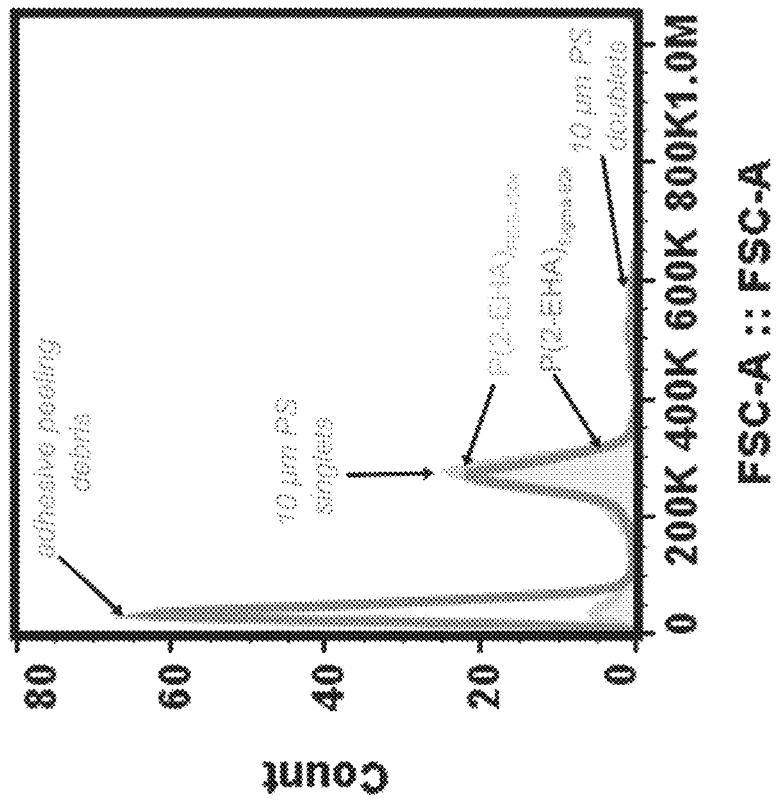
Figure 16A:
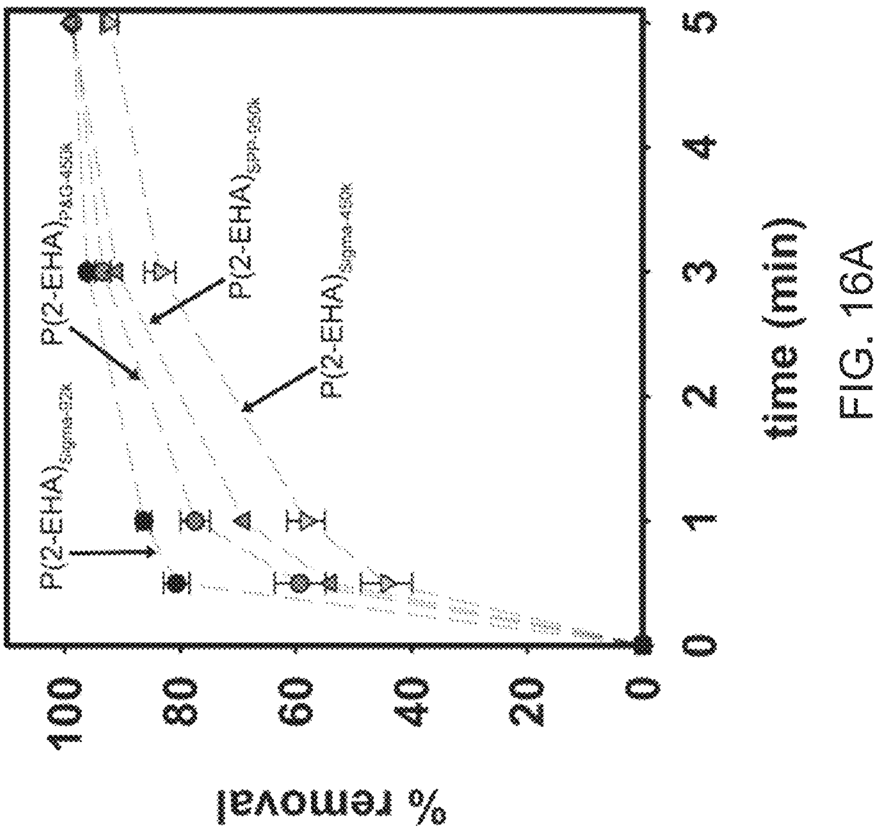
Figure 17:
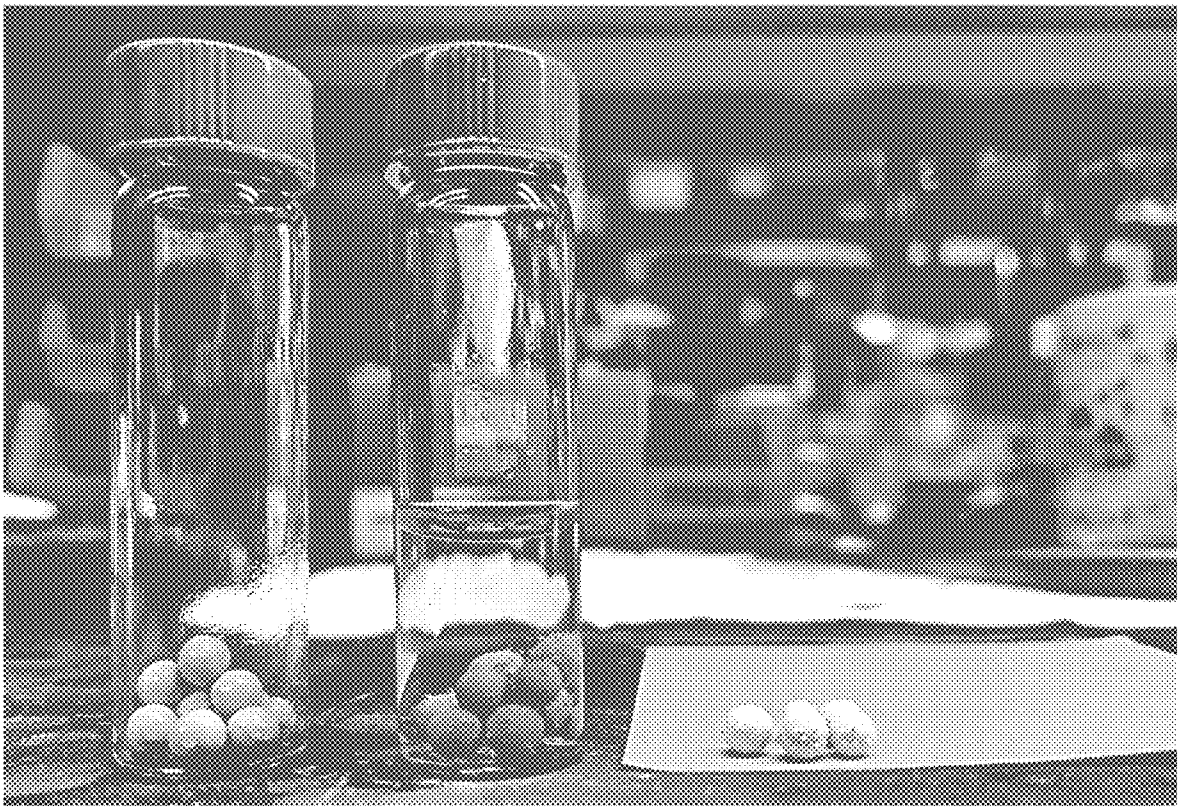
Figure 18A:
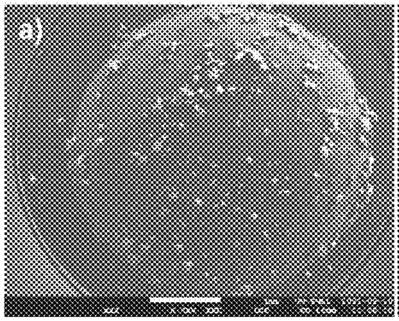
Figure 18B:
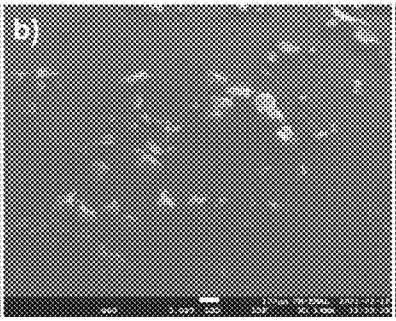
Figure 18C:
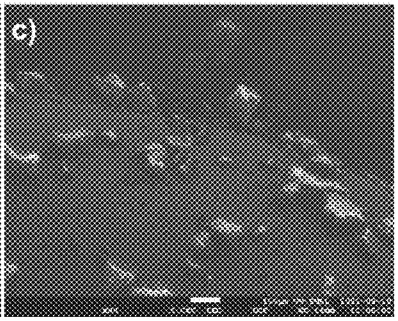
Figures 19A, 19B, 19C:
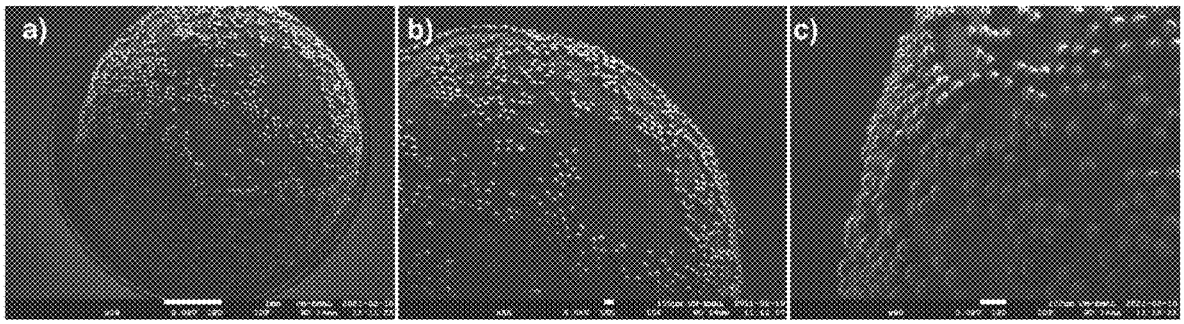
Figure 20:
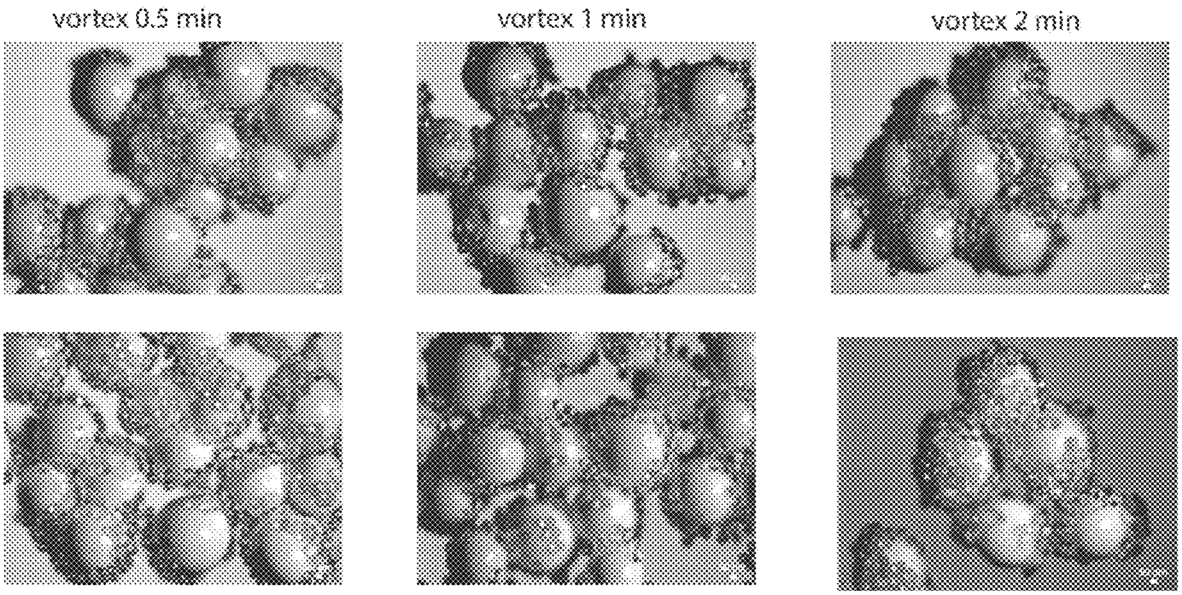
Figure 21B:
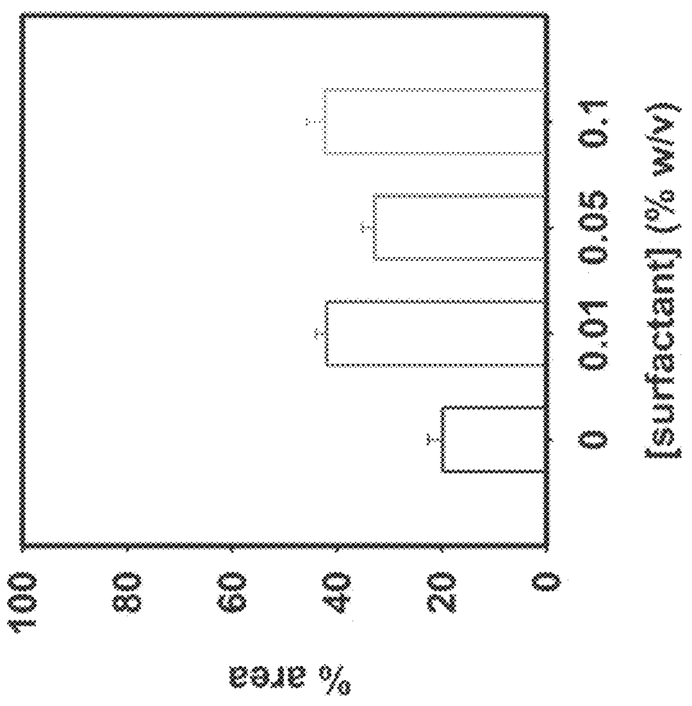
Figure 21A:
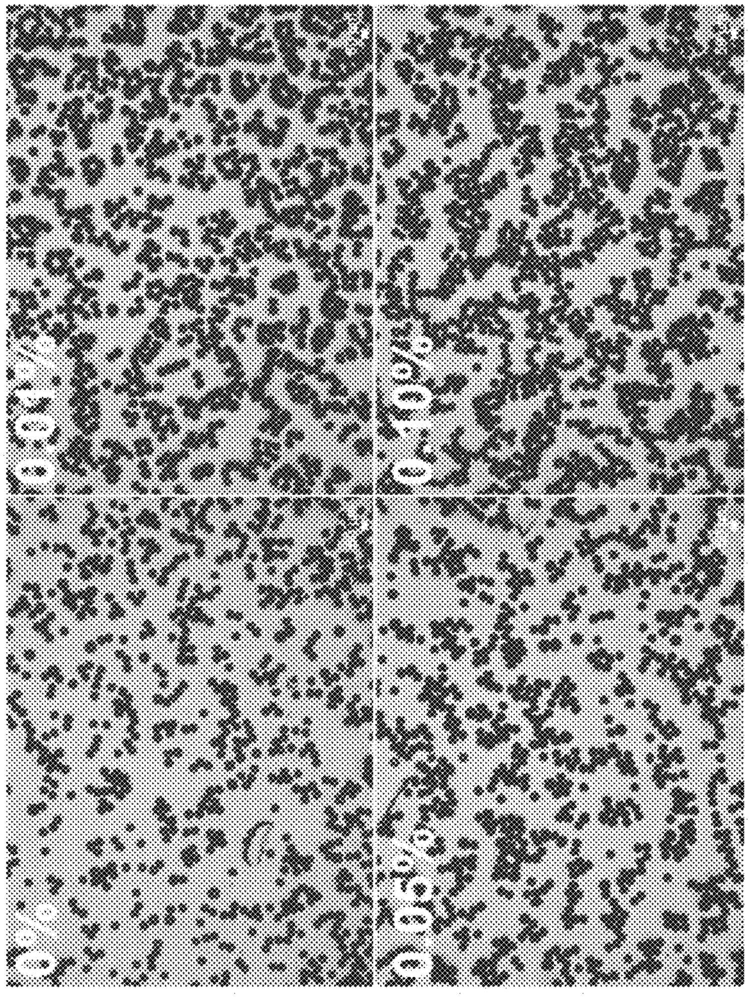
Figure 22:
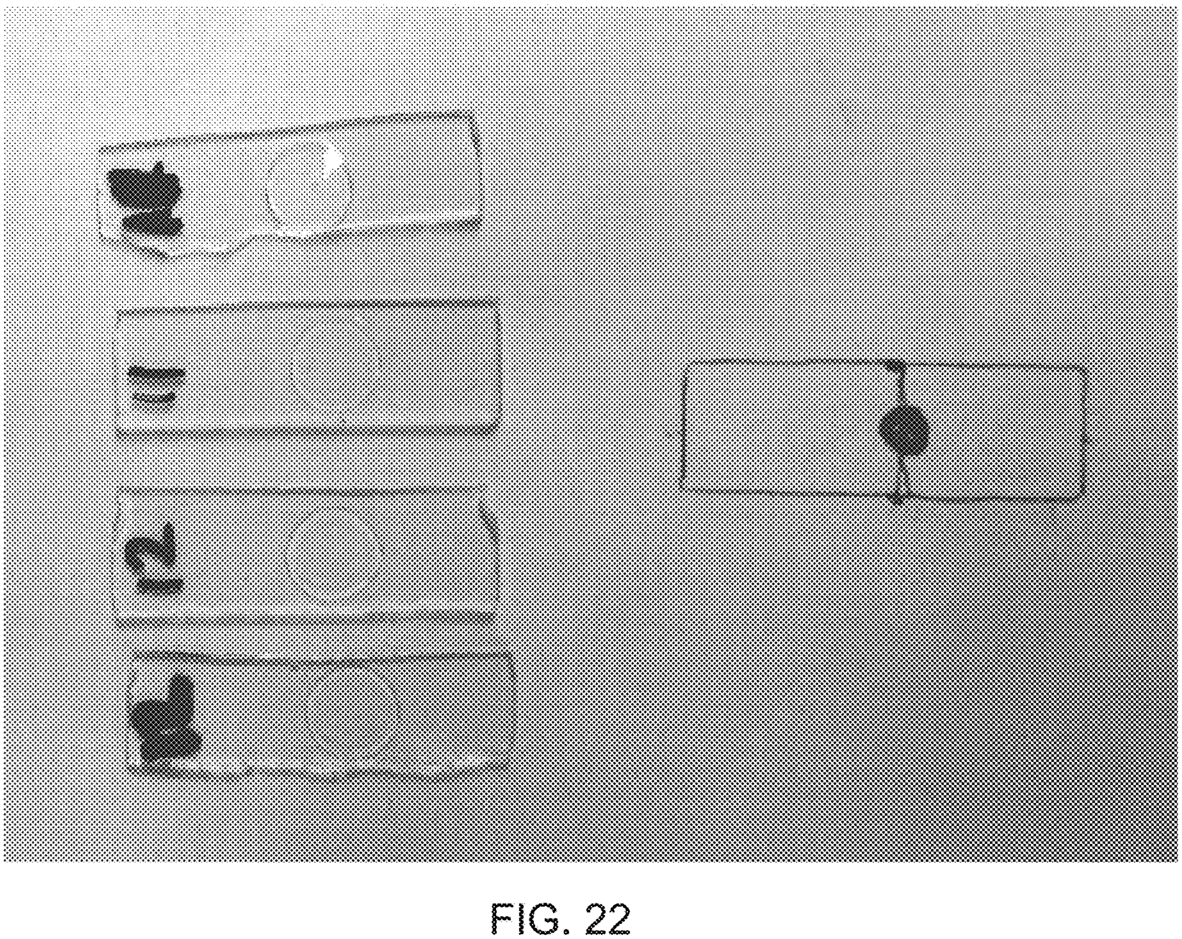
Figure 23:
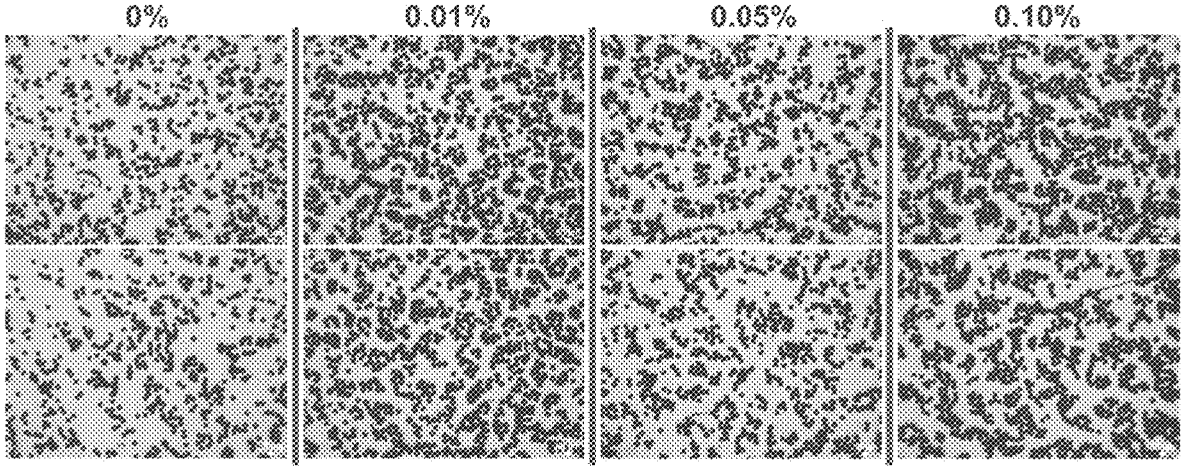

Having thus described the presently disclosed subject matter in general terms, reference will now be made to the accompanying Figures, which are not necessarily drawn to scale, and wherein:

FIG. 1 shows the fate of microplastics in the Lake Michigan watershed. (MFs=microfibers; image taken from Peller et al., 2019 (prior art);

FIG. 2 shows a conventional synthesis of pressure sensitive adhesives with a petroleum sourced monomer (top, red) versus using repurposed superabsorbent polymer fragments (bottom, blue);

FIG. 3 shows $M_w$ and $w_{max}$ versus time for sonicating PAA at 5% w/v (left) and IR spectra for esterification with 2-ethylhexanol 3-5 equivalence (right);

FIG. 4 shows viscoelastic windows spanned by PSAs synthesized by esterifying chain-shortened $PAA_{SAP}$;

FIG. 5 shows poly(ethylene) (PE) microplastics captured on a glass slide coated with the presently disclosed pressure-sensitive adhesive;

FIG. 6 is a schematic demonstrating the use of adhesives made from repurposed $PAA_{SAP}$ to capture microplastics in water;

FIG. 7 shows representative adhesive structures for synthesis from waste diapers and the like;

FIG. 8 shows optical micrographs demonstrating that a poly(2-ethylhexyl acetate) pressure-sensitive adhesive captures polyethylene and poly(isoprene), but not poly(ethylene terephthalate);

FIG. 9 shows optical micrographs of glass microscope slides coated with the presently disclosed pressure-sensitive adhesives (PSAs) demonstrating the capability of the PSAs to capture microplastics in an aqueous solution in the presence of laundry detergent at realistic concentrations of detergent. The images were taken of the slides after removal from the solution, after which the water was allowed to evaporate (about 30 min). The glass slides were immersed in the solution and shaken for about 10 to about 20 seconds to allow microplastic/adhesive contact and then it was taken out and left to air dry. In this example, the slides coated with the presently disclosed PSAs effectively removed as much microplastics at lower detergent levels as the control (no detergent);

FIG. 10 shows a representative three-dimensional article having protruding adhesive filaments coated with the presently disclosed pressure-sensitive adhesives;

FIG. 11A, FIG. 11B, and FIG. 11C show preliminary experiments demonstrating microplastics removal from water using an adhesive-coated stir bar to capture micronized rubber (~100 μm) suspended in water (FIG. 11A) and ImageJ calculations of percent area covered by 20-μm nylon (FIG. 11B) and 300-μm PET (FIG. 11C) captured at varying initial microplastics concentrations using adhesive-coated glass slides;

FIG. 12O, FIG. 12A, FIG. 12B, FIG. 12C, and FIG. 12D show preliminary experiments investigating spherical beads as substrates for microplastics removal. FIG. 12O adhesive-coated sieves initially aggregated before and later disaggregated after MPs capture experiments. FIG. 12A SEM image of sieves after capturing 300-μm PET in water. FIG. 12B Zoomed in SEM image of sieves after capturing 300-μm PET in water. FIG. 12C SEM image of sieves after capturing 90-μm PS in water. FIG. 12D Zoomed in SEM image of sieves after capturing 90-μm PS in water;

FIG. 13 shows optical microscopic images showing 90-μm PS captured by $PAA_{SPP\text{-}950k}$ coated 0.5-mm beads at different time points (left panel, 0.5 min; middle panel, 1 min; right panel, 2 min);

FIG. 14A and FIG. 14B show: FIG. 14A Pictorial representation of the inner workings of a flow cytometer instrument. FIG. 14B Dot plot scatter data of an experimental sample showing the distribution of particle events according to their aggregative state(s) at the interrogation point;

FIG. 15A and FIG. 15B are graphical representations of how FIG. 15A singlets and FIG. 15B doublets are analyzed according to a detector. Doublets have the same height, but double the area;

FIG. 16A and FIG. 16B are plots evaluating PSA efficiency in removing 10-μm PS beads from water. FIG. 16A Assessing percent removal over time for all four adhesives tested. FIG. 16B Histogram plot showing relative counts of potentially adhesive peeling debris, singlets, doublets, and triplets (not visible on the plot) for $P(2\text{-}EHA)_{Sigma\text{-}92k}$ and $P(2\text{-}EHA)_{P\&G\text{-}450k}$;

FIG. 17 shows the visualization of adhesive-coated post-use 2-mm molecular sieves before (left), and after (right) microplastics removal;

FIG. 18A, FIG. 18B, and FIG. 18C are SEM images of 2-mm post-use molecular sieves after capturing 300-μm PET in water;

FIG. 19A, FIG. 19B, and FIG. 19C are SEM images of 2-mm post-use molecular sieves after capturing 90-μm PS in water;

FIG. 20 shows optical microscope images showing 90-μm PS captured by $PAA_{SPP\text{-}950k}$ coated 0.5-mm beads at different time points (left panels, 0.5 min; middle panels, 1 min; right panel, 2 min);

FIG. 21A and FIG. 21B show the effect of surfactant (sodium dodecyl sulfate) concentration on MPs (40 μm PS) removal. FIG. 21A) Optical microscopic images showing MPs removal at various SDS concentrations. F) Bar graph showing percent are coverage calculated using ImageJ software;

FIG. 22 is a photograph of glass slides coated with $P(2\text{-}EHA)_{P\&G\_780k}$ for MPs removal; and FIG. 23 shows optical microscopic images on the effect of surfactant on microplastics removal.

DETAILED DESCRIPTION

The presently disclosed subject matter now will be described more fully hereinafter with reference to the accompanying Figures, in which some, but not all embodiments of the inventions are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Figures. Therefore, it is to be understood that the presently disclosed subject matter is not to be limited to the specific embodiments disclosed and that modifications and other embodiments are intended to be included within the scope of the appended claims.

I. Microplastic Removal Using Adhesives

Synthetic polymers used in most consumer applications are indispensable to our daily lives; however, their current sustainability profile needs improvement. Over 90% of the feedstock used to access these polymers comes from non-renewable petroleum resources. Geyer et al., 2017. Unfortunately, the chemical architectures (e.g., tenacious carbon-carbon backbones) that are desirable to confer high performance and durability also is responsible for the persistence of disposed post-consumer polymers in the environment. Barnes et al., 2009; Hong and Chen, 2017.

The presently disclosed approach includes the valorization of a common plastic waste—the superabsorbent polymer (SAP) used, for example, in baby diapers, adult incontinence products, and feminine hygiene products. The global annual production of this $PAA_{SAP}$ (i.e., sodium polyacrylate) is estimated to be over 2 million metric tons, with disposable diapers claiming 74% of the global market. Future Market Insights. Super Absorbent Polymer Market: Global Industry Analysis and Opportunity Assessment 2015-2020. If not incinerated, $PAA_{SAP}$ remains in landfills for centuries without degrading. Barnes et al., 2009.

To this end, a process for repurposing post-consumer SAP was previously developed. See, for example, U.S. Provisional Patent Application No. 62/890,880 for Depolymerization of Polymers to Collias, D. I.; Zimmerman, P. M.; Chazovachii, P. T.; Robo, M. T.; and McNeil, A. J., filed Aug. 23, 2019; U.S. Patent Application Publication No. 20210054161 for Depolymerization of Polymers to Collias et al., published Feb. 25, 2021; U.S. Provisional Patent Application No. 62/947,363 for Esterifying Polyacrylic Acid with High Conversion, to McNeil, A. J.; Chazovachii, P. T.; Robo, M. T.; Marsh, N. G.; Zimmerman, P. M.; James, M. I.; and Collias, D. I., filed Dec. 12, 2019; and U.S. Provisional Patent Application No. 62/890,943 for Super Absorbent Polymer Recycling to Pressure Sensitive Adhesives, to Collias, D. I.; Zimmerman, P.; Chazovachii, P. T.; Robo, M. T.; McNeil, A. J. filed Aug. 23, 2019; WO2021041326 for Super Absorbent Polymer Recycling to Pressure Sensitive Adhesives, to Collias et al., published Mar. 4, 2021, and U.S. Patent Application Publication No. 20210054248 for Super Absorbent Polymer Recycling to Pressure Sensitive Adhesives, to Collias et al., published Aug. 24, 2020, each of which is incorporated herein by reference in their entirety. In certain embodiments, the SAP described herein is an insoluble, crosslinked network polymer with an absorbency capacity of approximately 50 g/g of 0.9% NaCl (aq).

In this process, the used items are first collected and sterilized, removing bodily fluids and contaminants, and the components are separated using the semi-commercial Fater process. EP 2596811 (B1) to Somma et al., for Apparatus and Process for Sterilising Absorbent Sanitary Products, 2014; EP 2596810 (Al) for Sterilisation of Used Absorbent Sanitary Products. EP 2596810 (Al), to Somma et al., 2013;

https://www.fatersmart.com; Arena et al., 2016. This process includes a method to dewater the superabsorbent polymer using liquid-phase extraction with dimethyl ether; and a synthetic approach to repurpose the SAP into a value-added material (i.e., a pressure-sensitive adhesive (PSA)), using structure-property insights gleaned from computational data and analysis. The value of this approach was illustrated by modelling the social and environmental life-cycles for this chemical recycling approach, which found a significant reduction in global warming potential, fossil energy consumption and human health impacts, with increased economic value compared to state-of-the-art recycling technologies for SAPs.

PSAs are the fastest growing class of adhesives with numerous applications, including tapes, packaging, labels, sticky notes, bandages, and plastic wraps. Creton, 2003. Most commercial PSAs are accessed via air-sensitive radical polymerizations that rely on petroleum-sourced acrylic monomers (FIG. 2, top). See, for example, U.S. Pat. No. 9,822,286 for Self-Wetting Adhesive Composition to Fornof et al., issued Nov. 21, 2017; Pocious, 2002; O'Connor and Willenbacher, 2004; European Basic Acrylate Manufacturers, 2018.

Accessing acrylic acid building blocks from petroleum alone consumes a specific energy (w) of approximately 50 MJ/kg. An alternative approach, whereby $PAA_{SAP}$ is decrosslinked via hydrolysis, chain-shortened into building blocks via sonication, and functionalized into PSAs via esterification, was developed (FIG. 2, bottom). In this alternative approach, an initial goal was to obtain chain-shortened $PAA_{SAP}$ building blocks of appropriate weight average molecular weight ($M_w$) at w<50 MJ/kg. A second goal was to develop a relatively inexpensive approach to esterify poly(acrylic acid) with high conversions.

The efficiency of chain-shortening could be optimized by tuning multiple variables (i.e., decrosslinking, sonication time, and concentration) to achieve appropriately sized fragments below a maximum specific energy consumption limit ($w_{max}$<50 MJ/kg). It was found that fragments as short as approximately 300 kg/mol were achievable below the $w_{max}$ limit (FIG. 3, left).

Because acrylic PSAs have relatively high entanglement molecular weight ($M_c$), fragments with $M_w$≥400 kg/mol were targeted to confer sufficient cohesive strength without the need for crosslinking. Tobing and Klein, 2001. For the functionalizing step, Fischer esterification was selected because it is considered relatively facile and inexpensive for industrial applications. Fischer esterification, however, generates low yields due to the equilibrium with ester hydrolysis and various strategies, such as selectively removing water or using a large excess of alcohol, are commonly employed. U.S. Pat. No. 2,917,538 for Production of Acrylic Acid Esters to Carlyle, issued Dec. 15, 1959.

Interestingly, it was found that complete esterification was achievable regardless of the alcohol concentration (3-15 equivalents of 2-ethylhexanol) (FIG. 3, right). Further experiments and computations (not detailed herein) suggested that the hydrophobic reaction environment (i.e., immiscibility of 2-ethylhexanol and water) causes exclusion of water, which consequently impedes hydrolysis. The adhesive properties of the synthesized PSAs were evaluated using Chang's viscoelastic window (VW) concept. Chang, 1991. The PSAs fell into quadrant 3 and central regions of the VW (FIG. 4), which encompass various removable PSA applications (e.g., office tape, sticky notes, bandages, removable labels, and the like).

It was unexpectedly discovered that the PSAs prepared by this approach also were remarkably effective at capturing microplastics dispersed in aqueous solutions. In an illustrative example, rubber, polyamide, polyester, polyethylene, and polystyrene microplastics of varying sizes and shapes were absorbed on a thin coating of PSA on a glass slide. See, e.g., FIG. 5. Thus, the PSAs developed previously from waste diapers and the like can be repurposed to remove microplastics from various media, including water. See, e.g., FIG. 6. It is envisioned that the presently disclosed technology can be applied on a large scale, high impact applications to remove microplastics from wastewater at WWTPs and their subsequent repurposing, as well as for smaller devices or articles that trap microfibers at their source (e.g., laundry effluent) before conveyance into the water supply, e.g., a sewer, or as sedimentation or floatation aids in wastewater.

Microplastics are plastic particles with dimensions smaller than about 5 mm. These particles are introduced into the environment either intentionally as additives in consumer products (primary sources) or by the physical degradation of existing plastic materials (secondary sources). Most of the microplastics pollution in the environment is traced back to washing of textiles where over 20 $km^3$ of microplastics-contaminated water is generated every year globally, De Falco et al., 2019, and disposed of in wastewater treatment plants. Hernandez et al., 2017. During the treatment process, most of the microplastics in the influent (90-98%) are trapped together with biosolids only to be reintroduced into the environment as organic fertilizers. See FIG. 1, Peller et al., 2019.

Existing methods for removing microplastics from water involve physical entrapment, either in filters (lab-scale) or in sludge formation (WWTP). In both cases, only larger microplastics are captured and the smaller/thinner microplastics, including nanoplastics, which are more dangerous to humans and wildlife, readily pass through. The presently disclosed subject matter provides an alternative approach that overcomes this limitation by using non-covalent interactions to trap the microplastics. As a result, both the large and small/thin microplastics (including nanoplastics) are expected to be captured. It is thought that the presently disclosed pressure-sensitive adhesives will exhibit high adsorptive efficiencies for microplastics of varying compositions, sizes, and shapes. Without wishing to be bound to any one particular theory, it is thought that the efficacy of the presently approach will depend on the impact of the adhesive's chemical structure on microplastic adhesion and the composition/sizes/shapes of the microplastics.

There are several commercial laundry products for reducing microfibers at the machine level: (i) The lint LUV—R uses a stainless-steel mesh to capture large microfibers. http://www.environmentalenhancements.com; (ii) The CORA ball uses multiple, small, circular orifices to trap large microfibers. https://coraball.com;(iii) The Guppy-Friend nylon mesh bag operates under similar physical trapping principles. https://guppyfriend.com. Only the first two of these products have been tested in a peer-reviewed, scientific study, with the lint LUV—R being the most effective (87% reduction) (versus CORA ball (25% reduction)). McIlwraith et al., 2019. All three methods use physical entrapment to remove larger microfibers from laundry effluent.

The presently disclosed subject matter represents a paradigm-shifting approach, which relies on particle entrapment via adhesion. The advantages of this approach are that the adhesive properties can be tuned so as to best trap microplastics based on their composition, and there is no angular dependence as they encounter the "filter."

Unlike existing methods, which rely on physical entrapment (e.g., CORA ball (https://coraball.com), GuppyFriend (https://guppyfriend.com), and the like), the presently disclosed technology is based on noncovalent chemical interactions. Thus, the PSAs can capture microplastics well below the conventional threshold (approximately 50 μm to about 100 μm). In addition to the 2-ethylhexyl functional group used to make these adhesives, other functional groups that can amplify adhesive/microplastics interactions underwater also may be suitable for use with the presently disclosed subject matter. Waite, 1983; Tiu et al, 2019; and Clancy et al., 2016.

Good underwater adhesion is achieved by tailoring the pressure sensitive adhesive to have surface energy components ($\gamma=\gamma^d+\gamma^h$) that are compatible with the targeted microplastics. In other words, the adhesive is designed to exhibit a ratio of polar ($\gamma^h$) to dispersive ($\gamma^d$) components similar to those of the target microplastics. More particularly, an adhesive with a dispersive component (e.g., 2-ethylhexyl, stearyl, fluoroalkyl, and the like) will be effective at capturing similarly dispersive microplastics (e.g., poly(ethylene)). Likewise, microplastics with a high polar component (e.g., nylon, cellulose, poly(ethylene terephthalate), and the like) can be captured using adhesives containing groups with similarly high polar component (e.g., aromatic, ionic, Lewis base/acid, and the like). Such adhesive modifications are informed by mimicking marine adhesives and principles that correlate surface energy parameters with adhesion. Agirre et al., 2010; Kenney et al., 1992; and Karnal et al., 2019.

Several different classes of adhesives can potentially be used to remove microplastics of different sizes, shapes, and composition. Microplastics and PSAs have diverse properties, and understanding the relationship between their structure and adhesive ability will lead to a tunable platform for effective capture of microplastics. With regard to the adhesive structure, pressure-sensitive adhesives exhibit both viscous (flow) and elastic (resistance) properties. Creton, 2003. As the name implies, an adhesive "bond" forms between two materials with mild pressure. For strong adhesion, the adhesive must make intimate contact with the surface, in a process known as wetting. The degree of wetting depends on the chemical composition of that surface.

One parameter used to predict wetting is the surface energy, which is the excess energy that arises at the surface due to the lack of stabilizing interactions that are present in the bulk. Materials with high surface energies (e.g., metals and glass) easily form strong interactions with most adhesives (which have lower surface energies). As an illustrative example, an adhesive made from repurposed diapers easily adhered to glass slides (FIG. 5). Plastics, on the other hand, have lower surface energies and are more challenging to bond. Nevertheless, many adhesives have been developed to adhere to low surface energy plastics, including polyethylene. Agirre et al., 2010. Indeed, the presently disclosed synthesized adhesive was shown to capture PE microplastics in aqueous solutions (FIG. 5).

Of further interest is to elucidate how an adhesive's chemical structure impacts its efficiency in microplastic removal from water. Although there is extensive literature on adhesive/plastic interactions, much of this work was performed in air and may not translate to aqueous systems. As evidence, in cases where water was intentionally included, reduced adhesion strengths were found in both humid environments, Kenney et al., 1992, and aqueous media. Karnal et al, 2017; Tiu et al., 2019.

The surface energy of a material can be further broken down into two components—the polar and dispersive contributions. Some microplastics have surface energies that are solely dispersive (e.g., PE, PP), Zhu et al., 2019, whereas others have some polar contribution (e.g., polyamides, PET). Owens and Wendt, 1969. Although a single, general-purpose adhesive is more desirable from a use standpoint, having unique, selective adhesives for specific microplastics might aid their eventual separation and reuse. Two classes of adhesives are of particular interest for addressing the role of matching the polar/dispersive contributions of the adhesive with the microplastics to be captured.

One class of adhesives is based on the strong underwater adhesion demonstrated by mussel and barnacle proteins. Waite, 1983. These adhesive proteins display side-chains with polar, ionic, and hydrophobic groups, suggesting that all three are important for underwater adhesion to diverse surfaces. While most mussel-protein mimics utilize a catechol moiety for the polar group, in practice, this functional group is avoided because it can undergo oxidation, which would lead to long-term degradation issues in real-world conditions.

Recently, Tiu et al., 2019, and Clancy et al., 2016, showed that adhesives with a benzyl group (as a replacement for catechol) matched the adhesion strength of analogous catechol-containing adhesives in water. Clancy et al., 2016. Accordingly, in some embodiments, varying ratios of benzyl, alkyl, and ionic side-chains can be introduced using the versatile acid-catalyzed esterification process previously developed (FIG. 7, Scheme I). All of these adhesives can be ultimately synthesized starting from waste superabsorbent polymer. This process will generate copolymers with a random sequence of the functional groups.

Other tunable variables include the molecular weight, which can be adjusted by varying the sonication time, and the molecular weight distribution, which can be adjusted by mixing different batches with different number- or weight-average molecular weights. Previous studies have shown that, in general, lower molecular weights and higher molecular weight distributions lead to tackier materials. Creton, 2003. It is expected that these adhesives will be effective at capturing microplastics with significant polar components to their surface energies (e.g., PET, 43 $mJ/m^2$; polyamides, 43 $mJ/m^2$).

A second class of adhesives is based on the need to bond to the lower surface energy microplastics (e.g., PE, PP, and the like). More particularly, adhesives can be synthesized with varying quantities of superhydrophobic side-chains (e.g., perfluoroalkyl groups) co-mixed with branched hydrocarbon side-chains (FIG. 7, bottom). Polyfluorinated polymers (e.g., poly(1,1-pentadeca-fluoroctyl acrylate)) have some of the lowest surface energies (10.4 $mJ/m^2$) for any polymer, and are well below the surface energy of PE (33 $mJ/m^2$) and micronized rubber (29 $mJ/m^2$). Owens and Wendt, 1969.

Without wishing to be bound to any one particular theory, it is thought that the adhesion strength of such adhesives will be high, leading to efficient capture of low surface energy microplastics. One additional advantage of these hydrophobic materials is that the adhesive surface will repel water, which can block the surface and reduce microplastics capture. Water has a surface energy of 73 $mJ/m^2$ and forms significant hydration layers on polar surfaces with similarly high surface energies (e.g., polyethylene oxide, 43 $mJ/m^2$). Sugden, 1924. The fluorinated adhesives prepared herein should exhibit significantly less surface hydration. Again, these materials will be synthesized from waste diapers/hygiene products.

One challenge with introducing these perfluoroalkyl groups is that they may elevate the Tg too much, leading to a brittle material. To overcome this issue, the minimal amount of perfluoroalkyl side chains needed to lower the surface energy can be estimated using the "parachor" parameterization method. Roe, 1965. For both classes of adhesives, the surface energies will be measured using contact angle measurements on flat surfaces. Van Oss et al., 1986; Fowkes, 1962. In addition, rheology will be used to determine the adhesive's viscoelastic properties. Chang, 1991.

These parameters (dynamic (G') and loss (G") moduli) provide a measure of the cohesion and tack, which impacts the coating of adhesive onto substrates, as well as the ability to deform and trap microplastics. Differential scanning calorimetry can be used to measure the glass transition temperature (Tg), which is also provides insight into the adhesive's tackiness.

Next, probe-tack measurements will be performed to quantify the adhesion strength and work of debonding between the adhesive and plastic. Karnal et al., 2017. These measurements will be performed in water with a multimode force microscope (MMFM), which measure the interaction forces as a function of interaction time. Probe tips will be fabricated from the common polymers in microplastics pollution (e.g., polyethylene, polyethylene terephthalate, polyamides, and the like). All of the adhesives synthesized will be evaluated for their ability to capture microplastics of varying sizes, shapes, and identities, as described in more detail below.

The above-mentioned probe-tack measurements will provide insight into the macroscale adhesion strength in water of each adhesive for each plastic. Whether those adhesion strengths scale with the size and shape of the plastic particle also can be examined. To this end, microplastics with varying sizes and shapes will be synthesized or purchased. Microfibers can be prepared using a cryotome, and spherical microplastics can be prepared via emulsification in water. Powders, beads, and pellets can be purchased to use as is, or homogenized or ground in a cryogenic mill.

A simple protocol for quantifying microplastics capture in agitated and unagitated aqueous solutions using optical microscopy and image analysis software has been developed (see, e.g., FIG. 2, FIG. 8). Briefly, the adhesive is coated onto glass slides with a known surface area and then immersed in aqueous suspensions with known concentrations of microplastics for specified time periods. After removing the glass slide, snapshots of the film surface on the optical microscope, followed by statistical analysis, can be used to estimate each adhesive's capture efficiency as a function of the microplastic composition, size, and shape. While the primary focus is on optimizing the adhesive—microplastic interfacial interactions, the importance of the adhesive/clarifying particle interactions cannot be ignored, in particular for understanding how the small-scale experiments translate to the larger-scale flocculation or skimming experiments.

A long-term objective is to develop a chemical recycling route for the captured microplastics so that they may re-enter the value stream. The first step in accomplishing this goal will be to develop methods to release the captured microplastics from the adhesive-coated particles. Fortunately, pressure-sensitive adhesives lose their tack when the temperature is lowered. Thus, temperatures can be used where a simple abrasive can be used to brush off the microplastics without delaminating the adhesive.

Alternatively, if the temperature is raised above the glass-transition temperature, the adhesive will delaminate from the surface, carrying with it the microplastic. Then the adhesive could be selectively removed via dissolution in an organic solvent, enabling the insoluble microplastics to be isolated either via filtration or centrifugation. In either scenario, a mixture of microplastics with varying sizes, shapes, and compositions most likely will be present. Some of the microplastics may be separable via density-based partitioning, while mixed microplastics could be repurposed for park benches, carpet padding, and other composite materials. Less ideal, but still favorable compared to landfilling the materials, would be to incinerate the microplastics with energy recovery. Overall, the superabsorbent polymer-to-pressure-sensitive adhesive approach will serve to divert landfill-destined diapers, enabling them to re-enter the value chain while simultaneously reducing a key source of microplastics pollution.

There also has been growing concern over the human health impact of microplastics pollution in both indoor, for example, microplastics emitted from clothes dryers, and, to a lesser extent, outdoor air. To date, most air filtration devices are designed to trap larger particles via physical entrapment or electrostatics on a mesh, while much smaller particles readily pass through. In contrast, adhesive-coated substrates (e.g., a polymer-based cylindrical 3D-printed brush) should be effective at trapping micro- and nanoplastics via adhesion (a chemical interaction dominated by van der Waals forces) including polymers with varying sizes, shapes, or identities.

In representative embodiments, for example, a three-dimensional (3D) article having a surface (e.g., a brush, a geometrical solid shape, including, but not limited to, a bar, brush, sphere, impeller, rectangular slide, prolate sphere, cube, pyramid, hexagon, octagon, and a combination thereof, wherein the solid shape can be closed or open, and the like) that can be dip-coated with a thin layer, e.g., between about 0.5 to about 5 μm, including a layer of about 0.5, 1.0, 1.5, 2.0, 2.5, 3.0, 3.5, 4.0, 4.5, and 5.0 μm, of the presently disclosed pressure-sensitive adhesive can be used to filter micro- and nanoplastics from indoor or outdoor air. In such embodiments, the 3D article can include protruding adhesive filaments. See, for example, FIG. 10. In practice, the coated 3D article can be inserted into an air circulation device for efficient micro- and nanoplastic removal.

Accordingly, in some embodiments, the presently disclosed subject matter provides a method for removing micro- or nanoplastic particles from a medium, the methods comprising contacting the micro- or nanoplastic particles in the medium with an article comprising one or more pressure-sensitive adhesives, wherein the one or more pressure-sensitive adhesives comprise a compound of formula (I) or formula (II):

(I)

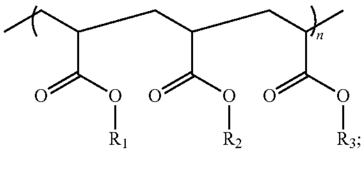

; or

-continued (II)

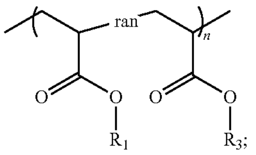

wherein:

each n is independently an integer from 1 to 10,000;

each $R_1$, $R_2$, and $R_3$, if present, is independently selected from the group consisting of:

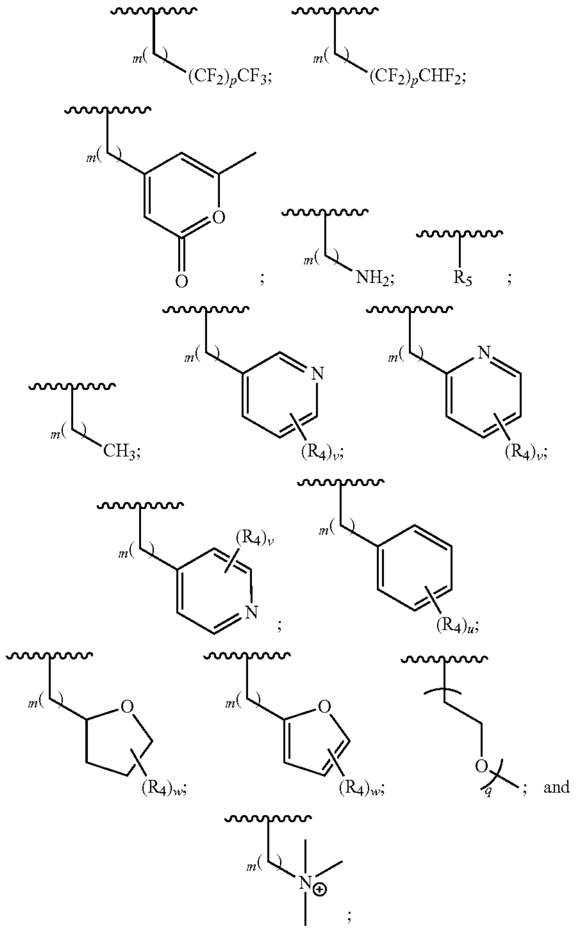

and wherein: each m is independently an integer selected from the group consisting of 1, 2, 3, 4, 5, 6, 7, and 8; p and q are each independently an integer selected from the group consisting of 1, 2, 3, 4, 5, 6, 7, and 8; u is an integer selected from the group consisting of 1, 2, 3, 4, and 5; v is an integer selected from the group consisting of 1, 2, 3, and 4; w is an integer selected from the group consisting of 1, 2, and 3; each $R_4$ is independently selected from the group consisting of H, $C_1$-$C_8$ substituted or unsubstituted branched or straight-chain alkyl, hydroxyl, $C_1$-$C_8$ alkoxyl, amino, cyano, —$CF_3$, carbonyl, carboxyl, $C_1$-$C_8$ alkynyl, acyl, carbamoyl, halogen, nitro, mercapto, and thiol; and $R_5$ is a $C_3$-Cao branched alkyl.

In certain embodiments, $R_1$, $R_2$, and $R_3$ are each independently selected from the group consisting of:

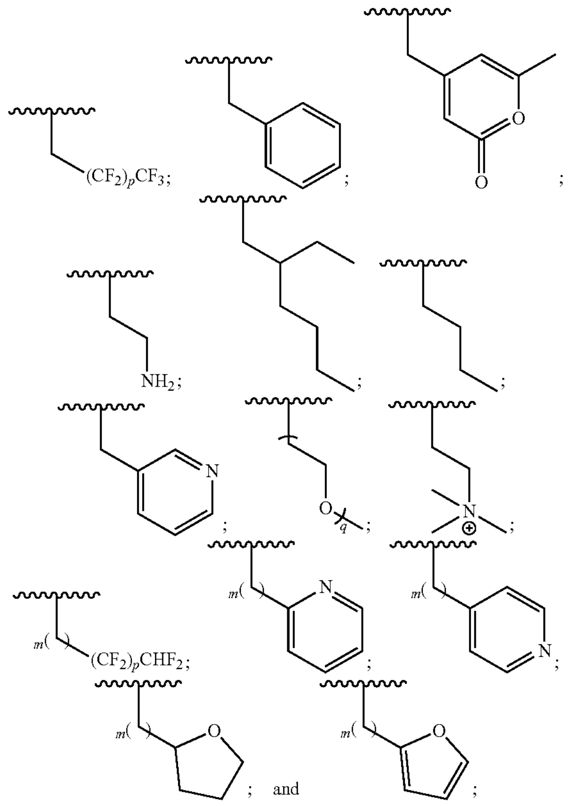

and wherein p and q are each independently integers selected from the group consisting of 1, 2, 3, 4, 5, 6, 7, and 8.

In certain aspects, the pressure sensitive adhesive is made from a recycled superabsorbent polymer (SAP). In particular aspects, the recycled SAP is degraded to poly(acrylic acid) (PAA); and wherein the PAA is derivatized to the pressure sensitive adhesive. See, for example, U.S. Provisional Patent Application No. 62/890,880 for Depolymerization of Polymers to Collias, D. I.; Zimmerman, P. M.; Chazovachii, P. T.; Robo, M. T.; and McNeil, A. J., filed Aug. 23, 2019; U.S. Patent Application Publication No. 20210054161 for Depolymerization of Polymers to Collias et al., published Feb. 25, 2021; U.S. Provisional Patent Application No. 62/947,363 for Esterifying Polyacrylic Acid with High Conversion, to McNeil, A. J.; Chazovachii, P. T.; Robo, M. T.; Marsh, N. G.; Zimmerman, P. M.; James, M. I.; and Collias, D. I., filed Dec. 12, 2019; and U.S. Provisional Patent Application No. 62/890,943 for Super Absorbent Polymer Recycling to Pressure Sensitive Adhesives, to Collias, D. I.; Zimmerman, P.; Chazovachii, P. T.; Robo, M. T.; McNeil, A. J. filed Aug. 23, 2019; WO2021041326 for Super Absorbent Polymer Recycling to Pressure Sensitive Adhesives, to Collias et al., published Mar. 4, 2021, and U.S. Patent Application Publication No. 20210054248 for Super Absorbent Polymer Recycling to Pressure Sensitive Adhesives, to Collias et al., published Aug. 24, 2020, each of which is incorporated herein by reference in their entirety. Particular embodiments are provided in Example 3 and Example 4 herein below.

In particular embodiments, the micro- or nanoplastic particles comprise a material selected from the group consisting of rubber, poly(isoprene), polyamide, polyester, poly (ethylene), poly(propylene), polystyrene, nylon, cellulose, poly(ethylene terephthalate), polyvinylfluoride (PVF), polyvinylidene fluoride (PVDF), poly(tetrafluoroethylene) (PTFE), polychlorotrifluoroethylene (PCTFE), perfluoroalkoxy alkane (PFA), fluorinated ethylene propylene (FEP), polyethylenetetrafluoroethylene (ETFE), polyethylenechlorotrifluoroethylene (ECTFE), perfluorinated elastomer (FFPM/FFKM), chlorotrifluoroethylenevinylidene fluoride (FPM/FKM), tetrafluoroethylene-propylene (FEPM), perfluoropolyether (PFPE), perfluorosulfonic acid (PFSA), perfluoropolyoxetane, and combinations thereof.

In certain embodiments, the medium is selected from the group consisting of an aqueous medium and an atmospheric medium. In more certain embodiments, the aqueous medium is selected from the group consisting of wastewater effluent from a wastewater treatment plant, laundry effluent from a commercial laundry facility, laundry effluent from a personal washing machine, and fill water in a washing machine during or after a washing cycle.

In certain embodiments, the atmospheric environment is selected from the group consisting of indoor air, outdoor air, and the emissions, exhaust, and/or vent of a commercial or personal clothes dryer.

In other embodiments, the method further comprising removing the micro- or nanoplastic particles from the one or more pressure-sensitive adhesives.

In some embodiments, the presently disclosed subject matter provides an article comprising one or more pressure-sensitive adhesives, wherein the one or more pressure-sensitive adhesives comprise a compound of formula (I) or formula (II):

(I)

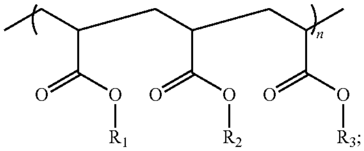

or (II)

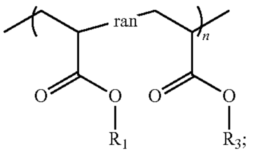

wherein:

each n is independently an integer from 1 to 10,000;

each $R_1$, $R_2$, and $R_3$, if present, is independently selected from the group consisting of:

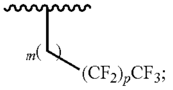

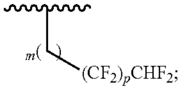

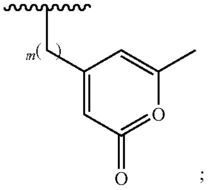

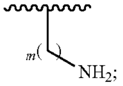

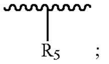

-continued

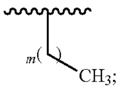

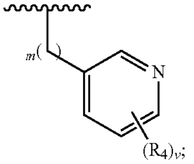

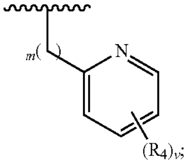

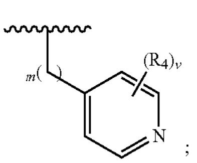

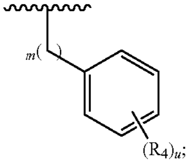

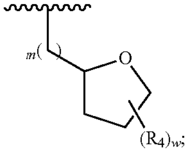

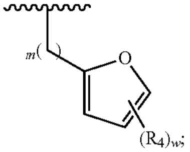

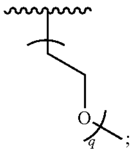

and

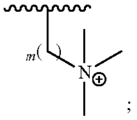

wherein: each m is independently an integer selected from the group consisting of 1, 2, 3, 4, 5, 6, 7, and 8; p and q are each independently an integer selected from the group consisting of 1, 2, 3, 4, 5, 6, 7, and 8; u is an integer selected from the group consisting of 1, 2, 3, 4, and 5; v is an integer selected from the group consisting of 1, 2, 3, and 4; w is an integer selected from the group consisting of 1, 2, and 3; each $R_4$ is independently selected from the group consisting of H, $C_1$-$C_8$ substituted or unsubstituted branched or straight-chain alkyl, hydroxyl, $C_1$-$C_8$ alkoxyl, amino, cyano, —$CF_3$, carbonyl, carboxyl, $C_1$-$C_8$ alkynyl, acyl, carbamoyl, halogen, nitro, mercapto, and thiol; and $R_5$ is a $C_3$-$C_{20}$ branched alkyl.

In certain embodiments, $R_1$, $R_2$, and $R_3$ are each independently selected from the group consisting of:

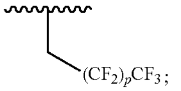

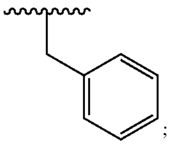

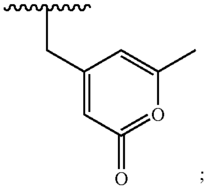

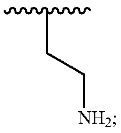

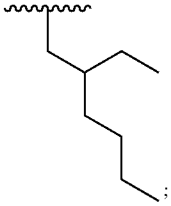

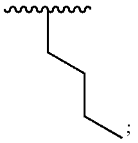

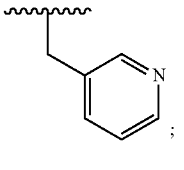

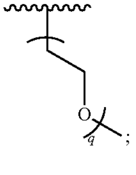

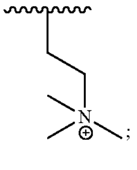

-continued

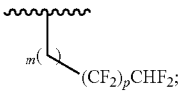;
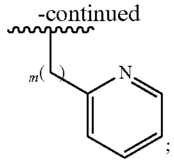;
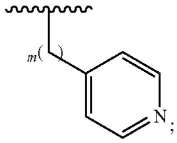;
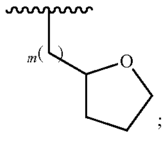; and
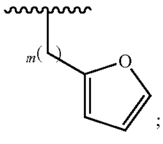;

wherein p and q are each independently integers selected from the group consisting of 1, 2, 3, 4, 5, 6, 7, and 8.

In certain aspects, the article comprises a pressure sensitive adhesive that is made from a recycled superabsorbent polymer (SAP). In particular aspects, the recycled SAP is degraded to poly(acrylic acid) (PAA); and wherein the PAA is derivatized to the pressure sensitive adhesive.

In particular embodiments, the article comprises a solid shape selected from the group consisting of a bar, brush, sphere, impeller, rectangular slide, prolate sphere, cube, pyramid, hexagon, octagon, and a combination thereof, wherein the solid shape can be closed or open. In more particular embodiments, the shape further comprises protruding filaments coated with the one or more pressure-sensitive filaments.

In further embodiments, the article is included in an air circulating system or device.

In yet further embodiments, the presently disclosed subject matter provides a washing machine or clothes dryer comprising the presently disclosed article.

In other embodiments, the presently disclosed subject matter provides a kit comprising the presently disclosed article.

II. Definitions

Although specific terms are employed herein, they are used in a generic and descriptive sense only and not for purposes of limitation. Unless otherwise defined, all technical and scientific terms used herein have the same meaning as commonly understood by one of ordinary skill in the art to which this presently described subject matter belongs.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be Obtained by the presently disclosed subject matter. For example, the term "about," when referring to a value can be meant to encompass variations of, in some embodiments, ±100% in some embodiments ±50%, in some embodiments ±20%, in some embodiments ±110%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of I to 5 includes 1, 2, 3, 4, and 5, as well as fractions thereof, e.g., 1.5, 2.25, 3.75, 4.1, and the like) and any range within that range.

While the following terms in relation to compounds of formula (I) or formula (II) are believed to be well understood by one of ordinary skill in the art, the following definitions are set forth to facilitate explanation of the presently disclosed subject matter. These definitions are intended to supplement and illustrate, not preclude, the definitions that would be apparent to one of ordinary skill in the art upon review of the present disclosure.

The terms substituted, whether preceded by the term "optionally" or not, and substituent, as used herein, refer to the ability, as appreciated by one skilled in this art, to change one functional group for another functional group on a molecule, provided that the valency of all atoms is maintained. When more than one position in any given structure may be substituted with more than one substituent selected from a specified group, the substituent may be either the same or different at every position. The substituents also may be further substituted (e.g., an aryl group substituent may have another substituent off it, such as another aryl group, which is further substituted at one or more positions).

Where substituent groups or linking groups are specified by their conventional chemical formulae, written from left to right, they equally encompass the chemically identical substituents that would result from writing the structure from right to left, e.g., $—CH_2O—$ is equivalent to $—OCH_2—$; $—C(═O)O—$ is equivalent to $—OC(═O)—$; $—OC(═O)NR—$ is equivalent to $—NRC(═O)O—$, and the like.

When the term "independently selected" is used, the substituents being referred to (e.g., R groups, such as groups $R_1$, $R_2$, and the like, or variables, such as "m" and "n"), can be identical or different. For example, both $R_1$ and $R_2$ can be substituted alkyls, or $R_1$ can be hydrogen and $R_2$ can be a substituted alkyl, and the like.

The terms "a," "an," or "a(n)," when used in reference to a group of substituents herein, mean at least one. For example, where a compound is substituted with "an" alkyl or aryl, the compound is optionally substituted with at least one alkyl and/or at least one aryl. Moreover, where a moiety is substituted with an R substituent, the group may be referred to as "R-substituted." Where a moiety is R-substituted, the moiety is substituted with at least one R substituent and each R substituent is optionally different.

A named "R" or group will generally have the structure that is recognized in the art as corresponding to a group having that name, unless specified otherwise herein. For the purposes of illustration, certain representative "R" groups as set forth above are defined below.

Descriptions of compounds of the present disclosure are limited by principles of chemical bonding known to those skilled in the art. Accordingly, where a group may be substituted by one or more of a number of substituents, such substitutions are selected so as to comply with principles of chemical bonding and to give compounds which are not inherently unstable and/or would be known to one of ordinary skill in the art as likely to be unstable under ambient conditions, such as aqueous, neutral, and several known physiological conditions.

Unless otherwise explicitly defined, a "substituent group," as used herein, includes a functional group selected from one or more of the following moieties, which are defined herein:

The term hydrocarbon, as used herein, refers to any chemical group comprising hydrogen and carbon. The hydrocarbon may be substituted or unsubstituted. As would be known to one skilled in this art, all valencies must be satisfied in making any substitutions. The hydrocarbon may be unsaturated, saturated, branched, unbranched, cyclic, polycyclic, or heterocyclic. Illustrative hydrocarbons are further defined herein below and include, for example, methyl, ethyl, n-propyl, isopropyl, cyclopropyl, allyl, vinyl, n-butyl, tert-butyl, ethynyl, cyclohexyl, and the like.

The term "alkyl," by itself or as part of another substituent, means, unless otherwise stated, a straight (i.e., unbranched) or branched chain, acyclic or cyclic hydrocarbon group, or combination thereof, which may be fully saturated, mono- or polyunsaturated and can include di- and multivalent groups, having the number of carbon atoms designated (i.e., $C_{1-10}$ means one to ten carbons, including 1, 2, 3, 4, 5, 6, 7, 8, 9, and 10 carbons). In particular embodiments, the term "alkyl" refers to $C_{1-20}$ inclusive, including 1, 2, 3, 4, 5, 6, 7, 8, 9, 10, 11, 12, 13, 14, 15, 16, 17, 18, 19, and 20 carbons, linear (i.e., "straight-chain"), branched, or cyclic, saturated or at least partially and in some cases fully unsaturated (i.e., alkenyl and alkynyl) hydrocarbon radicals derived from a hydrocarbon moiety containing between one and twenty carbon atoms by removal of a single hydrogen atom.

Representative saturated hydrocarbon groups include, but are not limited to, methyl, ethyl, n-propyl, isopropyl, n-butyl, isobutyl, sec-butyl, tert-butyl, n-pentyl, sec-pentyl, isopentyl, neopentyl, n-hexyl, sec-hexyl, n-heptyl, n-octyl, n-decyl, n-undecyl, dodecyl, cyclohexyl, (cyclohexyl)methyl, cyclopropylmethyl, and homologs and isomers thereof.

"Branched" refers to an alkyl group in which a lower alkyl group, such as methyl, ethyl or propyl, is attached to a linear alkyl chain. "Lower alkyl" refers to an alkyl group having 1 to about 8 carbon atoms (i.e., a $C_{1-8}$ alkyl), e.g., 1, 2, 3, 4, 5, 6, 7, or 8 carbon atoms. "Higher alkyl" refers to an alkyl group having about 10 to about 20 carbon atoms, e.g., 10, 11, 12, 13, 14, 15, 16, 17, 18, 19, or 20 carbon atoms. In certain embodiments, "alkyl" refers, in particular, to $C_{1-8}$ straight-chain alkyls. In other embodiments, "alkyl" refers, in particular, to $C_{1-8}$ branched-chain alkyls.

Alkyl groups can optionally be substituted (a "substituted alkyl") with one or more alkyl group substituents, which can be the same or different. The term "alkyl group substituent" includes but is not limited to alkyl, substituted alkyl, halo, arylamino, acyl, hydroxyl, aryloxyl, alkoxyl, alkylthio, arylthio, aralkyloxyl, aralkylthio, carboxyl, alkoxycarbonyl, oxo, and cycloalkyl. There can be optionally inserted along the alkyl chain one or more oxygen, sulfur or substituted or unsubstituted nitrogen atoms, wherein the nitrogen substituent is hydrogen, lower alkyl (also referred to herein as "alkylaminoalkyl"), or aryl.

Thus, as used herein, the term "substituted alkyl" includes alkyl groups, as defined herein, in which one or more atoms or functional groups of the alkyl group are replaced with another atom or functional group, including for example, alkyl, substituted alkyl, halogen, aryl, substituted aryl, alkoxyl, hydroxyl, nitro, amino, alkylamino, dialkylamino, sulfate, cyano, and mercapto.

The term "heteroalkyl," by itself or in combination with another term, means, unless otherwise stated, a stable straight or branched chain having from 1 to 20 carbon atoms or heteroatoms or a cyclic hydrocarbon group having from 3 to 10 carbon atoms or heteroatoms, or combinations thereof, consisting of at least one carbon atom and at least one heteroatom selected from the group consisting of O, N, P, Si and S, and wherein the nitrogen, phosphorus, and sulfur atoms may optionally be oxidized and the nitrogen heteroatom may optionally be quaternized. The heteroatom(s) O, N, P and S and Si may be placed at any interior position of the heteroalkyl group or at the position at which alkyl group is attached to the remainder of the molecule. Examples include, but are not limited to, $-CH_2-CH_2-O-CH_3$, $-CH_2-CH_2-NH-CH_3$, $-CH_2-CH_2-N(CH_3)-CH_3$, $-CH_2-S-CH_2-CH_3$, $-CH_2-CH_2-S(O)-CH_3$, $-CH_2-CH_2-S(O)_2-CH_3$, $-CH{=}CH-O-CH_3$, $-Si(CH_3)_3$, $-CH_2-CH{=}N-OCH_3$, $-CH{=}CH-N(CH_3)-CH_3$, $O-CH_3$, $-O-CH_2-CH_3$, and $-CN$. Up to two or three heteroatoms may be consecutive, such as, for example, $-CH_2-NH-OCH_3$ and $-CH_2-O-Si(CH_3)_3$.

As described above, heteroalkyl groups, as used herein, include those groups that are attached to the remainder of the molecule through a heteroatom, such as $-C(O)NR'$, $-NR'R''$, $-OR'$, $-SR$, $-S(O)R$, and/or $-S(O_2)R'$. Where "heteroalkyl" is recited, followed by recitations of specific heteroalkyl groups, such as $-NR'R$ or the like, it will be understood that the terms heteroalkyl and $-NR'R''$ are not redundant or mutually exclusive. Rather, the specific heteroalkyl groups are recited to add clarity. Thus, the term "heteroalkyl" should not be interpreted herein as excluding specific heteroalkyl groups, such as $-NR'R''$ or the like.

An unsaturated hydrocarbon has one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. Alkyl groups which are limited to hydrocarbon groups are termed "homoalkyl."

More particularly, the term "alkenyl" as used herein refers to a monovalent group derived from a $C_{2-20}$ inclusive straight or branched hydrocarbon moiety having at least one carbon-carbon double bond by the removal of a single hydrogen molecule. Alkenyl groups include, for example, ethenyl (i.e., vinyl), propenyl, butenyl, 1-methyl-2-buten-1-yl, pentenyl, hexenyl, octenyl, allenyl, and butadienyl.

The term "alkynyl" as used herein refers to a monovalent group derived from a straight or branched $C_{2-20}$ hydrocarbon of a designed number of carbon atoms containing at least one carbon-carbon triple bond. Examples of "alkynyl" include ethynyl, 2-propynyl (propargyl), 1-propynyl, pentynyl, hexynyl, and heptynyl groups, and the like.

The term "alkylene" by itself or a part of another substituent refers to a straight or branched bivalent aliphatic hydrocarbon group derived from an alkyl group having from 1 to about 20 carbon atoms, e.g., 1, 2, 3, 4, 5, 6, 7, 8, 9, 10, 11, 12, 13, 14, 15, 16, 17, 18, 19, or 20 carbon atoms. The alkylene group can be straight, branched or cyclic. The alkylene group also can be optionally unsaturated and/or substituted with one or more "alkyl group substituents." There can be optionally inserted along the alkylene group one or more oxygen, sulfur or substituted or unsubstituted nitrogen atoms (also referred to herein as "alkylaminoalkyl"), wherein the nitrogen substituent is alkyl as previously described. Exemplary alkylene groups include methylene ($-CH_2-$); ethylene ($-CH_2-CH_2-$); propylene ($-(CH_2)_3-$); cyclohexylene ($-C_6H_{10}$); $-CH=CH-CH=CH-$; $-CH=CH-CH_2-$; $-CH_2CH_2CH_2CH_2-$, $-CH_2CH=CHCH_2-$, $-CH_2CsCCH_2-$, $-CH_2CH_2CH(CH_2CH_2CH_3)CH_2-$, $-(CH_2)_q-N(R)-(CH_2)_r-$, wherein each of q and r is independently an integer from 0 to about 20, e.g., 0, 1, 2, 3, 4, 5, 6, 7, 8, 9, 10, 11, 12, 13, 14, 15, 16, 17, 18, 19, or 20, and R is hydrogen or lower alkyl; methylenedioxyl ($-O-CH_2-O-$); and ethylenedioxyl ($-O-(CH_2)_2-O-$). An alkylene group can have about 2 to about 3 carbon atoms and can further have 6-20 carbons. Typically, an alkyl (or alkylene) group will have from 1 to 24 carbon atoms, with those groups having 10 or fewer carbon atoms being some embodiments of the present disclosure. A "lower alkyl" or "lower alkylene" is a shorter chain alkyl or alkylene group, generally having eight or fewer carbon atoms.

A structure represented generally by the formula:

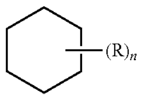 or 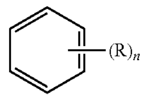

as used herein refers to a ring structure, for example, but not limited to a 3-carbon, a 4-carbon, a 5-carbon, a 6-carbon, a 7-carbon, and the like, aliphatic and/or aromatic cyclic compound, including a saturated ring structure, a partially saturated ring structure, and an unsaturated ring structure, comprising a substituent R group, wherein the R group can be present or absent, and when present, one or more R groups can each be substituted on one or more available carbon atoms of the ring structure. The presence or absence of the R group and number of R groups is determined by the value of the variable "n," which is an integer generally having a value ranging from 0 to the number of carbon atoms on the ring available for substitution. Each R group, if more than one, is substituted on an available carbon of the ring structure rather than on another R group. For example, the structure above where n is 0 to 2 would comprise compound groups including, but not limited to:

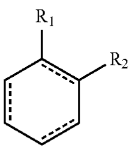 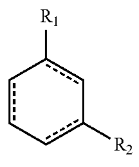 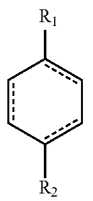

and the like.

The symbol  denotes the point of attachment of a moiety to the remainder of the molecule.

When a named atom of an aromatic ring or a heterocyclic aromatic ring is defined as being "absent," the named atom is replaced by a direct bond.

As used herein, the term "acyl" refers to an organic acid group wherein the —OH of the carboxyl group has been replaced with another substituent and has the general formula $RC(=O)-$, wherein R is an alkyl, alkenyl, alkynyl, aryl, carbocylic, heterocyclic, or aromatic heterocyclic group as defined herein). As such, the term "acyl" specifically includes arylacyl groups, such as a 2-(furan-2-yl) acetyl)- and a 2-phenylacetyl group. Specific examples of acyl groups include acetyl and benzoyl. Acyl groups also are intended to include amides, $-RC(=O)NR'$, esters, $-RC(=O)OR'$, ketones, $-RC(=O)R'$, and aldehydes, $-RC(=O)H$.

The terms "alkoxyl" or "alkoxy" are used interchangeably herein and refer to a saturated (i.e., alkyl—O—) or unsaturated (i.e., alkenyl—O— and alkynyl—O—) group attached to the parent molecular moiety through an oxygen atom, wherein the terms "alkyl," "alkenyl," and "alkynyl" are as previously described and can include $C_{1-20}$ inclusive, linear, branched, or cyclic, saturated or unsaturated oxo-hydrocarbon chains, including, for example, methoxyl, ethoxyl, propoxyl, isopropoxyl, n-butoxyl, sec-butoxyl, tert-butoxyl, and n-pentoxyl, neopentoxyl, n-hexoxyl, and the like.

"Carbamoyl" refers to an amide group of the formula $-C(=O)NH_2$. "Alkylcarbamoyl" refers to a $R'RN-C(=O)-$ group wherein one of R and R' is hydrogen and the other of R and R' is alkyl and/or substituted alkyl as previously described. "Dialkylcarbamoyl" refers to a $R'RN-C(=O)-$ group wherein each of R and R' is independently alkyl and/or substituted alkyl as previously described.

The term "amino" refers to the $-NH_2$ group and also refers to a nitrogen containing group as is known in the art derived from ammonia by the replacement of one or more hydrogen radicals by organic radicals. For example, the terms "acylamino" and "alkylamino" refer to specific N-substituted organic radicals with acyl and alkyl substituent groups respectively.

The term "carbonyl" refers to the $-C(=O)-$ group, and can include an aldehyde group represented by the general formula $R-C(=O)H$.

The term "carboxyl" refers to the —COOH group. Such groups also are referred to herein as a "carboxylic acid" moiety.

The term "cyano" refers to the $-C\equiv N$ group.

The terms "halo," "halide," or "halogen" as used herein refer to fluoro, chloro, bromo, and iodo groups. Additionally, terms such as "haloalkyl," are meant to include monohaloalkyl and polyhaloalkyl. For example, the term "halo$(C_{1-4})$alkyl" is mean to include, but not be limited to, trifluoromethyl, 2,2,2-trifluoroethyl, 4-chlorobutyl, 3-bromopropyl, and the like.

The term "hydroxyl" refers to the —OH group.

The term "mercapto" refers to the —SH group.

The term "nitro" refers to the $-NO_2$ group.

The term "thio" refers to a compound described previously herein wherein a carbon or oxygen atom is replaced by a sulfur atom.

EXAMPLES

The following Examples have been included to provide guidance to one of ordinary skill in the art for practicing representative embodiments of the presently disclosed subject matter. In light of the present disclosure and the general level of skill in the art, those of skill can appreciate that the following Examples are intended to be exemplary only and that numerous changes, modifications, and alterations can be employed without departing from the scope of the presently disclosed subject matter. The synthetic descriptions and specific examples that follow are only intended for the purposes of illustration, and are not to be construed as limiting in any manner to make compounds of the disclosure by other methods.

Example 1

Synthesis of Poly(2-ethylhexyl acrylate)

The presently disclosed adhesives can be synthesized by esterifying poly(acrylic acid) with the respective alcohols or polymerizing various (meth)acrylate monomers (Scheme I).

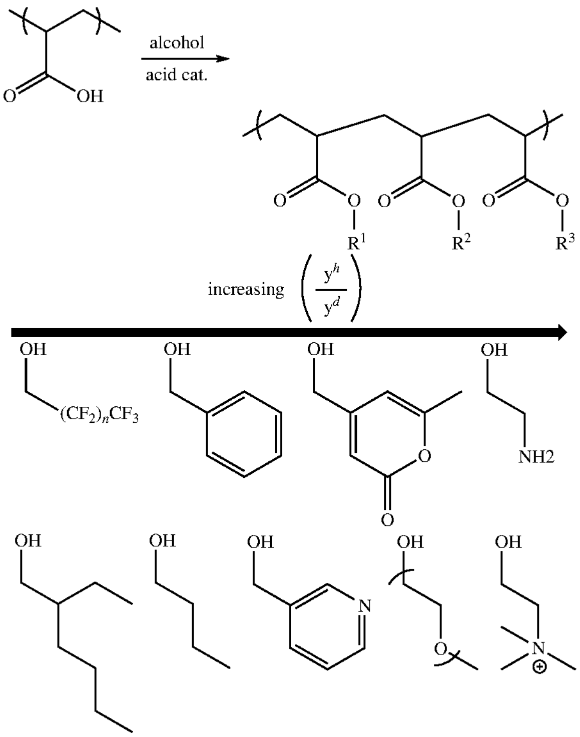

Scheme I shows representative pressure-sensitive adhesives, which can be prepared by esterifying polyacrylic acids, in which $R^1$, $R^2$, and $R^3$ are derived from the representative alcohols.

In this example, poly(2-ethylhexyl acrylate) adhesive was synthesized by esterifying poly(acrylic acid). The adhesive was used to test underwater adhesion of polyethylene, micronized rubber (poly(isoprene)), and poly(ethylene terephthalate). The adhesive was coated onto glass slides and immersed into 50 mL centrifuge tube containing microplastics (1 mg) dispersed in DI water (15 mL). As can be seen in FIG. 8, only microplastics with a similarly low $$\frac{\gamma^h}{\gamma^d}$$

adhered (e.g., polyethylene).

Example 2

Adhesive of Microplastics in the Presence of Detergent

The poly(2-ethylhexyl acrylate) adhesive was coated onto glass slides and immersed into a 50-mL centrifuge tube containing polyethylene (1 mg) dispersed in DI water, 0.1% detergent, and 1% detergent (15 mL) (FIG. 9). These data indicate that the presently disclosed pressure-sensitive adhesives are capable of capturing microplastics in laundry effluent at realistic concentrations of laundry detergent.

Example 3

Super Absorbent Polymer Recycling to Pressure Sensitive Adhesives

In one embodiment, the pressure-sensitive adhesive is prepared by the methods disclosed in U.S. Patent Application No. 62/890,943 for "Super Absorbent Polymer Recycling to Pressure Sensitive Adhesives," filed Aug. 23, 2019; WO2021041326 for Super Absorbent Polymer Recycling to Pressure Sensitive Adhesives, to Collias et al., published Mar. 4, 2021, and U.S. Patent Application Publication No. 20210054248 for Super Absorbent Polymer Recycling to Pressure Sensitive Adhesives, to Collias et al., published Aug. 24, 2020, each of which is incorporated herein by reference in its entirety. In such embodiments, the method includes de-crosslinking, ultrasound-induced &polymerization, and base-catalyzed co-esterification, with an optional deprotection step. This method achieves high molecular weight polyacrylate based PSAs having a molecular weight of about 400 kg/mol to about 900 kg/mol.

More particularly, in one embodiment, the method for preparing a pressure sensitive adhesive from one or more sodium polyacrylate-based superabsorbent polymers comprises: (a) providing a solution comprising one or more sodium polyacrylate-based superabsorbent polymers; (b) decrosslinking the one or more sodium polyacrylate-based superabsorbent polymers to provide one or more decrosslinked sodium polyacrylate-based superabsorbent polymers; (c) optionally sonicating the one or more decrosslinked sodium polyacrylate-based superabsorbent polymers to provide one or more chain-shortened sodium polyacrylate-based superabsorbent polymers; (d) protonating the one or more decrosslinked and/or chain-shortened sodium polyacrylate-based superabsorbent polymers to provide one or more protonated decrosslinked and/or chain-shortened polyacrylic acid-based superabsorbent polymers; and (e) esterifying the one or more protonated decrosslinked and/or chain-shortened polyacrylic add-based superabsorbent polymers to provide a pressure sensitive adhesive.

In certain embodiments, this method is exemplified in Scheme II:

(Scheme II)

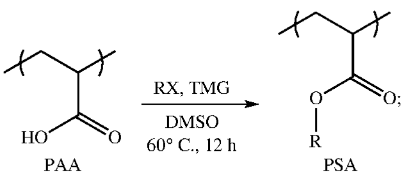

PAA PSA wherein: RX is an alkyl halide; TMG is 1,1,3,3-tetramethylguanidine ($Ga(CH_3)_3$), and DMSO is dimethyl sulfoxide.

In certain embodiments, the decrosslinking of the one or more sodium polyacrylate-based superabsorbent polymers comprises contacting the one or more sodium polyacrylate-based superabsorbent polymers with a base to provide one or more decrosslinked sodium polyacrylate-based superabsorbent polymers. In certain embodiments, the base is an inorganic base. In more certain embodiments, the inorganic base is selected from the group consisting of NaOH; KOH, $Na_2CO_3$, and $K_2CO_3$.

In some embodiments, the method comprises removing the base from the one or more decrosslinked sodium polyacrylate-based superabsorbent polymers. In particular embodiments, the removing of the base from the one or more decrosslinked sodium polyacrylate-based superabsorbent polymers comprises dialyzing the one or more decrosslinked sodium polyacrylate-based superabsorbent polymers using a molecular porous membrane tubing. One of ordinary skill in the art would recognize that other ultrafiltration methods based on size exclusion would be suitable for use with the presently disclosed methods. Non-limiting examples of desalination processes are membrane processes (e.g., reverse osmosis, forward osmosis, electrodialysis reversal (EDR), nanofiltration, and the like), freezing desalination, solar desalination, geothermal desalination, ion exchange, wave powered desalination, and the like.

In some embodiments, the decrosslinking of the one or more sodium polyacrylate-based superabsorbent polymers comprises partially decrosslinking the one or more sodium polyacrylate-based superabsorbent polymers.

In some embodiments, the method further comprises filtering the one or more decrosslinked sodium polyacrylate-based superabsorbent polymers to remove residual crosslinked sodium polyacrylate-based superabsorbent polymers therefrom.

In particular embodiments, the protonating of the one or more decrosslinked sodium polyacrylate-based superabsorbent, polymers comprises contacting the one or more decrosslinked sodium polyacrylate-based superabsorbent polymers with a cation exchange resin to provide one or more protonated polyacrylic acid-based superabsorbent polymers. In more particular embodiments, the cation exchange resin comprises a sulfonic acid functional group.

In certain embodiments, the esterifying of the one or more protonated polyacrylic acid-based superabsorbent polymers comprises contacting the one or more protonated polyacrylic acid-based superabsorbent polymers with one or more organohalide compounds. In more certain embodiments, the one or more organohalide compounds comprises a primary or a secondary organohalide compound. In yet more certain embodiments, the primary or secondary organohalide compound comprises at least one halogen atom selected from the group consisting of Cl, Br, and I. In even more certain embodiments, the primary or secondary organohalide compound comprises a $C_1$-$C_{12}$ straight-chain or branched alkyl group. In particular embodiments, the one or more organohalide compound is selected from the group consisting of methyl iodide, ethyl iodide, n-butyl bromide, n-octyl bromide, propargyl bromide (3-bromo-1-propyne), ethyl bromoacetate, ethyl chloroacetate, (1-bromoethyl)benzene, benzyl chloride, benzyl bromide, isobutenyl chloride (3-chloro-2-methylprop-1-ene), 2-ethylhexylbromide, and 2-ethylhexylchloride.

In some embodiments, the one or more organohalide compounds comprises a protecting group to provide one or more protected esterified protonated sodium polyacrylate-based superabsorbent, polymers. In particular embodiments, the protecting group is selected from the group consisting of tert-butoxycarbonyl (BOC), 9-fluorenylmethoxycarbonyl (FMOC), and the like. In such embodiments, the presently disclosed method further comprises deprotecting the one or more protected esterified protonated polyacrylic acid-based. superabsorbent polymers.

In some embodiments of the presently disclosed method, the esterifying of the one or more protonated polyacrylic acid-based superabsorbent polymers comprises contacting the one or more protonated polyacrylic acid-based superabsorbent polymers with one or more promoters. In certain embodiments, the one or more promoters is selected from the group consisting of 1,1,3,3-tetramethylguanidine (TMG), triethylamine, and pyridine.

In some embodiments of the presently disclosed method, the esterifying of the one or more protonated polyacrylic acid-based superabsorbent polymers is done in a polar aprotic solvent. In certain embodiments, the polar aprotic solvent is selected from the group consisting of dimethyl sulfoxide (DMSO) and N,N-dimethylformamide (DMF).

Example 4

Methods for Esterifying Polyacrylic Acid with High Conversion

In another embodiment, the pressure-sensitive adhesive is prepared by the methods disclosed in U.S. Patent Application No. 62/947,363 for "Esterifying Polyacrylic Acid with High Conversion," filed Dec. 12, 2019; WO2021041326 for Super Absorbent Polymer Recycling to Pressure Sensitive Adhesives, to Collias et al., published Mar. 4, 2021, and U.S. Patent Application Publication No. 20210054248 for Super Absorbent Polymer Recycling to Pressure Sensitive Adhesives, to Collias et al., published Aug. 24, 2020, each of which is incorporated herein by reference in their entirety. This method achieves a high degree of esterification without the need to remove water from the reaction.

Fischer esterification is widely used to alkylate carboxylic acids for a variety of applications because it is cost effective and greener than alternatives. Water, which is the reaction byproduct of Fischer esterification, however, can react with the desired product to reform starting material. This byproduct reaction consequently results in low conversions. Due to this challenge, most Fischer esterification processes known in the art including removing water from the reaction mixture to push the reaction forward.

Unlike small molecule esterification processes that are impeded by water, the high degrees of esterification for polyacrylic acid can be achieved within three hours without the need to remove water. This result can be achieved at equivalences of alcohol as low as 1:2 relative to the acrylic acid repeat. As provided in more detail herein below, in some embodiments, a 1:1 ratio of alcohol to water was used (in a pressure vessel to avoid water escape) and high degrees of esterification were still achieved.

In contrast to the method shown in Scheme II immediately hereinabove, an alternative method for preparing PSA from PAA as shown in Scheme III:

(Scheme III)

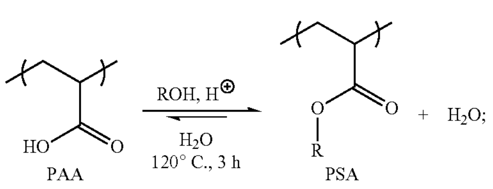

wherein ROH is an alcohol and ⊕ is a strong acid. Thus, this method involves the esterification of a carboxylic acid functional group with an alcohol, e.g., ROH, with heating in the presence of a strong acid.

Further, a high degree of esterification can be achieved using this method, for example, when $R_1$ is 2-ethylhexyl as is shown in Scheme Ma:

Scheme IIIa

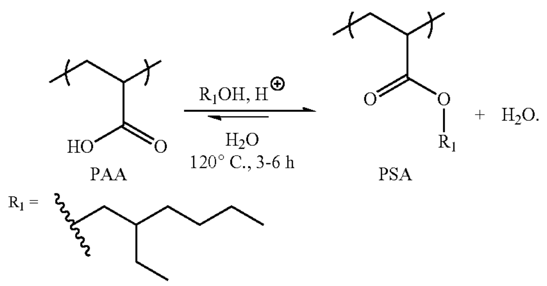

The poly(2-ethylhexyl acrylate) (PSA) formed by the method of Scheme Ma is soluble in alcohol after 3 hrs, whereas the polyacrylic acid (PAA) starting material is not soluble in alcohol. The high conversion is achieved regardless of the amount of alcohol used.

Further, it has been found that the presence of water does not appreciably impede polymer esterification. In some embodiments, reactions were run in pressure vessels to prevent water escape (Scheme IV).

Scheme IV. Exemplary reaction run in pressure vessels to prevent water escape.

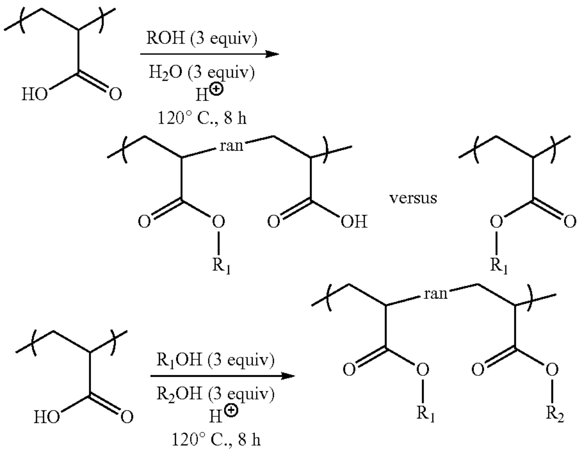

-continued

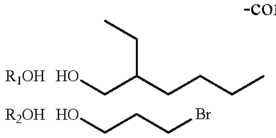

Accordingly, in some embodiments, a method for preparing a pressure sensitive adhesive from one or more sodium polyacrylate-based superabsorbent polymers comprises: (a) providing one or more sodium polyacrylate-based superabsorbent polymers; and (b) contacting the one or more sodium polyacrylate-based superabsorbent polymers with one or more alcohols in the presence of an acid for a period of time at a predetermined temperature to provide a pressure sensitive adhesive.

In certain embodiments, the one or more alcohols is selected from the group consisting of 2-ethylhexanol, 3-bromopropanol, and combinations thereof. In particular embodiments, the one or more alcohols is 2-ethylhexanol.

One of ordinary skill in the art would appreciate that the presently disclosed methods could be used with one or more alkyl alcohols. As used herein, the term “alkyl” means, unless otherwise stated, a straight (i.e., unbranched) or branched chain, acyclic or cyclic hydrocarbon group, or combination thereof, which may be fully saturated, mono- or polyunsaturated and can include di- and multivalent groups, having the number of carbon atoms designated (i.e., $C_1$-$C_{10}$ means one to ten carbons). In particular embodiments, the term “alkyl” refers to $C_1$-$C_{20}$ inclusive, linear (i.e., “straight-chain”), branched, or cyclic, saturated or at least partially and in some cases fully unsaturated (i.e., alkenyl and alkynyl) hydrocarbon radicals derived from a hydrocarbon moiety containing between one and twenty carbon atoms by removal of a single hydrogen atom.

Representative saturated hydrocarbon groups include, but are not limited to, methyl, ethyl, n-propyl, isopropyl, n-butyl, isobutyl, sec-butyl, tert-butyl, n-pentyl, sec-pentyl, iso-pentyl, neopentyl, n-hexyl, sec-hexyl, n-heptyl, n-octyl, n-decyl, n-undecyl, dodecyl, cyclohexyl, (cyclohexyl)methyl, cyclopropylmethyl, and homologs and isomers thereof.

“Branched” refers to an alkyl group in which a lower alkyl group, such as methyl, ethyl or propyl, is attached to a linear alkyl chain. “Lower alkyl” refers to an alkyl group having 1 to about 8 carbon atoms (i.e., a $C_{1-8}$ alkyl), e.g., 1, 2, 3, 4, 5, 6, 7, or 8 carbon atoms. “Higher alkyl” refers to an alkyl group having about 10 to about 20 carbon atoms, e.g., 10, 11, 12, 13, 14, 15, 16, 17, 18, 19, or 20 carbon atoms. In certain embodiments, “alkyl” refers, in particular, to $C_{1-8}$ straight-chain alkyls. In other embodiments, “alkyl” refers, in particular, to $C_{1-8}$ branched-chain alkyls.

Alkyl groups can optionally be substituted (a “substituted alkyl”) with one or more alkyl group substituents, which can be the same or different. The term “alkyl group substituent” includes but is not limited to alkyl, substituted alkyl, halo, arylamino, acyl, hydroxyl, aryloxyl, alkoxyl, alkylthio, arylthio, aralkyloxyl, aralkylthio, carboxyl, alkoxycarbonyl, oxo, and cycloalkyl.

Thus, the presently disclosed methods are applicable to alkyl alcohols, including, but not limited to, methanol, ethanol, n-propanol, isopropanol, n-butanol, isobutanol, sec-butanol, tert-butanol, n-pentanol, sec-pentanol, iso-pentanol, neopentanol, n-hexanol, sec-hexanol, n-heptanol, n-octanol, n-decanol, n-undecanol, dodecanol, each of which can be substituted with one or more substituent groups, including straight-chain or branched alkyl, or halo. The terms "halo," "halide," or "halogen" as used herein refer to fluoro, chloro, bromo, and iodo groups.

In some embodiments, the acid comprises an inorganic acid. In other embodiments, the acid comprises an organic acid. Representative inorganic acids include, but are not limited to, hydrochloric acid, nitric acid, phosphoric acid, sulfuric acid, boric acid, hydrofluoric acid, hydrobromic acid, perchloric acid, and hydroiodic acid. In particular embodiments, the inorganic acid is sulfuric acid. Representative organic acids include, but are not limited to, arylsulfonic acids, such as benzenesulfonic acid, tosylic acid, p-styrenesulfone, 2-naphthalenesulfonic acid, 4-hydroxybenzenesulfonic acid, 5-sulfosalicylic acid, p-dodecylbenzenesulfonic acid, dihexylbenzenesulfonic acid, 2,5-dihexylbenzenesulfonic acid, dibutylnaphthalenesulfonic acid, 6,7-dibutyl-2-naphthalenesulfonic acid, dodecylnaphthalenesulfonic acid, 3-dodecyl-2-naphthalenesulfonic acid, hexylnaphthalenesulfonic acid, 4-hexyl-1-naphthalenesulfonic acid, octylnaphthalenesulfonic acid, 2-octyl-1-naphthalenesulfonic acid, hexylnaphthalenesulfonic acid, 7-hexyl-1-naphthalenesulfonic acid, 6-hexyl-2-naphthalenesulfonic acid, dinonylnaphthalenesulfonic acid, 2,7-dinonyl-4-naphthalenesulfonic acid, dinonylnaphthalenedisulfonic acid, 2,7-dinonyl-4,5-naphthalenedisulfonic acid, and the like.

In certain embodiments, the acid is selected from the group consisting of tosylic acid d sulfuric acid.

In certain embodiments, the one or more alcohols is present in about a 1:2 ratio relative to an acrylic acid repeat unit of the one or more sodium polyacrylate-based superabsorbent polymers. In certain embodiments, the one or more alcohols is present about a 1:1 ratio relative to an amount of water.

In some embodiments, the predetermined temperature has range from between about 60° C. to about 180° C., including 60, 65, 70, 75, 80, 85, 90, 95, 100, 105, 110, 115 120, 125, 130, 135, 140, 145, 150, 155, 160, 165,170, 175, and 180° C. In particular embodiments, the predetermined temperature is about 120° C.

In some embodiments, the period of time has a range from about 1 hour to about 8 hours, including 1, 2, 3, 4, 5, 6, 7, and 8 hours. In particular embodiments, the period of time is about three hours. In more particular embodiments, the method does not require a step of removing water. In even yet more particular embodiments, the method is performed in a pressure vessel.

Example 5

Adhesive Coated Beads as Substrates for Efficient Microplastics Removal

5.1 Preliminary Results

Referring now to FIG. 11A, FIG. 11B, and FIG. 11C, preliminary experiments demonstrated microplastics removal from water using an adhesive coated stir bar to capture micronized rubber suspended in water and nylon and PET captured at varying initial microplastics concentrations using adhesive coated glass slides. Next, methods to improve the presently disclosed microplastics (MPs) removal efficiency (RE) by increasing the frequency of PSA-MPs collisions were explored. Without wishing to be bound to any one particular theory, it was thought that using adhesive coated small spherical objects would increase the frequency of collisions due to the increased available surface area and increased mobility relative to the flat and immobile glass slides in the previous examples. While exploring this idea, it was important to note that the beads can be too small to the point of not generating enough force and, under these circumstances, disaggregation from the clumping occurs after the adhesive is applied.

In preliminary experiments, 2-mm post-use molecular sieves found in the lab were dip coated and evaluated for capturing 300-μm PET and 90-μm PS. Although the adhesive coated sieves initially aggregated, immediate disaggregation was observed within 30 s of mild hand-shaking (3 shakes per second). The disaggregation was likely due to the obstruction of the adhesive surface by the captured microplastics. The sieves were analyzed using scanning electron microscopy (SEM) and indeed, the sieves were effective at capturing both PET (FIG. 12A and FIG. 12B) and PS (FIG. 12C and FIG. 12D). After noting the presence of some debris released by the sieves, zirconium silicate beads (0.5 mm) were used for the next experiments. The dense metallic beads are less prone to material shedding, even under high impact activity, such as ball milling.

Using adhesive-coated zirconium beads, the efficacy of removing 90-μm PS as a function of time under saturation conditions (i.e., a large excess MPs were used) was investigated. MPs removal was induced by vortex mixing the samples at the 10/10 setting for durations spanning 0.5 min to 2 min and the results were analyzed using optical microscopy. Based on the optical microscope images, the removal of MPs using adhesive coated zirconium silicate beads, which are made of a different material and smaller than the sieves used earlier, was confirmed.

5.2 Identifying Flow Cytometry as a Method for Quantifying Removal Efficiency In the previous examples, MPs captured by the adhesive coated substrate were analyzed using optical and scanning electron microscopy techniques. From there, the evaluation of the method's MPs RE was sought. Due to the small sizes and extremely low concentrations (i.e., post-remediation) of MPs in removal tests, a reliable method for quantification needed to be identified. As with the examples highlighted earlier, the quantification methods generally used in the field to evaluate microplastics removal widely vary, which makes it challenging to compare results holistically. UV-Vis spectroscopy has been used for microplastics quantification, Zhang et al., 2018; Mitzel et al., 2016, although this approach may provide inaccurate results because suspended particles tend to scatter light rather than absorb. Chemistry LibreTexts, 2021. Although hemocytometry also has been used for microplastics quantification and can be very accurate within its detection bounds, the lower limit of detection is too high (i.e., ~$2.5\times10^5$ counts/mL) to accurately determine microplastics post-removal tests. Bio-Rad, 2021.

Flow cytometry is a practical and relatively precise method for quantifying MPs concentration in aqueous suspensions. Jaroszeski and Radcliff, 1999. The flow cytometer employed in these experiments, an Attune N×T, can analyze concentrations as low as 500 particles/mL to as high as 1,000,000 particles/mL. Most commonly applied in the fields of microbiology and biomedical engineering, this technique allows researchers to analyze single cell populations and rapidly retrieve data about many parameters concerning those cells (i.e., cell type, size, surface characteristics, morphology, immunological activity, and the like). Colson and Michel, 2021, Kaile et al., 2020. The working principle (FIG. 14A) of the flow cytometry technique involves using a sheath fluid to hydrodynamically focus a stream of events (these can be cells, particles, or other discrete matter) single file in front of a laser where they are subsequently detected, counted, and/or sorted. Often researchers working with cellular organisms will stain plasma membranes with dye-conjugated antibodies to sort populations of interest.

For the instant application, fluorescence staining was not necessary as the only population in the samples were the monodisperse MPs. Thus, the forward scatter (FSC) detector, a photomultiplier that analyzes events in proportion to their size was employed. Forward scattered light is detected along the direction of the laser beam and is a result of light diffracting from the perimeter of the event. Another detector, the side scatter detector, measures scatter perpendicular to the laser beam and provides information on the internal complexity of the event. The forward scatter detector was used for data analysis due to the MPs having a simplistic internal structure consisting of solid, densely packed polystyrene (PS) material.

After much trial and error, the instruments settings were finalized as follows: laser voltage: 200, sample flow rate: 25 μL/min (for 5- and 10-μm sized particles), sample volume: 30 μL. To calculate concentration, the number of events were divided by the collected sample volume and scaled to find the number of particles per milliliter.

The total number of events include not only the singlets, which are the single events the detector picks up as particles pass by one by one, but also doublets and triplets. Although the intention of flow cytometry analysis is to analyze events one by one as they pass through the laser interrogation point (so that all events can be represented as singlets), at times, two or three events will cluster with one another during analysis, leading to the presence of doublets or triplets on the scatter plots and histograms. As shown in FIG. 13, from a mock sample displaying 10-μm beads, the greatest percentage of events in the sample is represented as singlets (~48%), while doublets and triplets form less than 15% of the sample combined. Doublets and triplets can be recognized by the magnitude of F SC-area. Although the event peak has the same FSC-height (intensity) as a singlet due to its similar size, the area of the peak will approximately double and triple the singlet area, respectively due to aggregation of events (FIG. 13 y-axis and FIG. 14A, FIG. 14B). The events represented by "other" are those smaller than the microplastic beads and is most likely evidence of the adhesive peeling off the beads during agitation of the vial.

5.3 Effect of Time and Adhesive Molar Mass on Removal Efficiency

As discussed hereinabove, the molar mass is key to the performance of a pressure-sensitive adhesive. The softness required for a PSA to quickly wet a substrate is most conferrable at low molar mass (e.g., <400 kg/mol) whereas high molar mass (e.g., >500 kg/mol) is required for shear holding power and cohesion. For this reason, microplastics removal using four PSAs with molecular weights spanning 92-950 kg/mol were comparatively tested. The suspended microplastics were monodisperse 10-μm PS, which made it easier to identify singlets and various multiplets, and also differentiate from foreign particles in flow cytometry measurements. To achieve uniform MPs suspensions for more accurate quantification, 20% ethanol was added to the formulations to reduce the surface tension of water, which is an accepted practice in the field. Chen et al., 2020. The samples were hand shaken for an appropriate amount of time (0.5, 1, 3, and 5 min) at 3 shakes per sec and the suspensions were transferred into Eppendorf's tubes using a needle (18 G) and syringe, and the aliquots (1 mL) were analyzed using flow cytometry.

Over the first 30 s, P(2-EHA)$_{Sigma\text{-}92k}$ reproducibly exhibited a remarkable 80% RE, whereas the other adhesive ranged at 40-60% (FIG. 15A). The observed trend is likely due to the P(2-EHA)$_{Sigma\text{-}92k}$ superior tack properties conferred by its low molar mass. In the end, P(2-EHA)$_{Sigma\text{-}92k}$ and P(2-EHA)$_{P\&G\text{-}450k}$ had >98% RE followed by P(2-EHA)$_{SPP\text{-}950k}$ with 96%, and P(2525EHA)$_{Sigma\text{-}450k}$ with 92%. It is interesting to note that P(2-EHA)$_{P\&G\text{-}450k}$, which was developed from recycled polymer, performed better than P(2-EHA)$_{Sigma\text{-}450k}$ despite having a similar molar mass and dispersity. Because these PSAs were prepared from different sources, the performance variation maybe be due to slight differences in esterification extents (e.g., residual carboxylic acid groups) or structural effects (e.g., branched versus linear chains).

While gating the samples in flow cytometry measurements, curious peaks (i.e., "other") not identified as any of the possible multiplets were observed (FIG. 14B). The forward scatter height (FSC—H) suggested that these "other" particulates were not a 10-μm PS multiplet. As explained earlier, multiplet populations appear at the same FSC—H with their respective singlets. Also, the forward scatter area (FSC-A) suggested that the "other" particles were −4 times smaller than the 10-μm PS singlets (FIG. 16B).

It was initially thought that these particles were contaminants in the MPs stock suspension (e.g., control samples). However, although the controls contained 6,500 counts/mL of "other" particles (Table 1), the controls could not have been the primary source because "other" counts actually increased in one sample set (i.e., Sigma-92k). Except for two of four replicates for SPP-950k 5 min, the "other" counts decreased to <0.5 of the initial value (i.e., ~6,500 counts/mL) at 0.5 min and remain relatively unchanged thereafter. Except for the two outlier 5 min replications, a similar trend is also observed for the P(2-EHA)$_{Sigma\text{-}950k}$. For the low molar mass P(2-EHA)$_{Sigma\text{-}92k}$, a notable increase in the "other" peak is observed. For instance, at 3 min timepoint, there is a comparable count of singlets versus "other". At the 5 min time point, there are ~78% more "other" particle counts over singlets (e.g., Table 1 and FIG. 15B). Based on these observations it is unlikely that the "other" particles are primarily from the microplastics stock suspension. Without wishing to be bound to any one particular theory, it is thought that the emerged "other" counts were generated by adhesive peeling from the P(2-EHA)$_{Sigma\text{-}92k}$ because its molar mass is too low to form strong cohesive interactions.

TABLE 1

Summary of flow cytometry data

| sample name | singlets/mL | doublets/mL[a] | triplets/mL[b] | other/mL[c] | sum/mL | % removal |
|---|---|---|---|---|---|---|
| Control (t = 0 min) | 791708 | 144915 | 17935 | 6560 | 1135344 | 0% |
| Sigma-92k 0.5 min | 138470 | 25549 | 9882 | 19705 | 219214 | 81% |
| Sigma-92k 1 min | 97078 | 18257 | 7368 | 19722 | 155694 | 86% |
| Sigma-92k 3 min | 29695 | 5162 | 1315 | 18049 | 43964 | 96% |
| Sigma-92k 5 min | 11072 | 1440 | 275 | 19739 | 14777 | 99% |

TABLE 1-continued

Summary of flow cytometry data

| sample name | singlets/mL | doublets/mL[a] | triplets/mL[b] | other/mL[c] | sum/mL | % removal |
|---|---|---|---|---|---|---|
| P&G-450k 0.5 min | 349633 | 47586 | 5678 | 2872 | 461838 | 59% |
| P&G-450k 1 min | 200399 | 24201 | 2464 | 2506 | 256194 | 77% |
| P&G-450k 3 min | 63187 | 5178 | 458 | 2256 | 74917 | 93% |
| P&G-450k 5 min | 14444 | 708 | 75 | 2489 | 16084 | 99% |
| Sigma-450k 0.5 min | 432592 | 77398 | 14777 | 2681 | 631718 | 44% |
| Sigma-450k 1 min | 318698 | 58625 | 12512 | 2581 | 473484 | 58% |
| Sigma-450k 3 min | 125350 | 22910 | 5211 | 3172 | 186805 | 84% |
| Sigma-450k 5 min | 62845 | 9649 | 1690 | 2622 | 87213 | 92% |
| SPP-950k 0.5 min | 410489 | 66375 | 9740 | 2539 | 572460 | 50% |
| SPP-950k 1 min | 300175 | 45904 | 5703 | 2947 | 409091 | 64% |
| SPP-950k 3 min | 120663 | 15976 | 2023 | 3188 | 158683 | 86% |
| SPP-950K 5 min | 33275 | 3305 | 266 | 12379 | 40684 | 96% |

[a,b]The doublets and triplets were multiplied by the respective factors in the sum value calculation.
[c]The "other" counts were not included in the sum value.

5.4 Experimental Methods

5.4.1 Adhesive Coated Beads as Substrates for Microplastics Removal

Used dry molecular sieves (2.0 mm, 10.0 g) were PSA coated by adding $PAA_{SPP\text{-}950k}$ solution (1 mL, 5.0% w/v.). The beads were hand-shaken (3 shakes per second) for 2 min, oven dried (120° C.) for 10 min, and left to cool to ambient temperature.

A PET suspension in water (1.5 mg/mL) was prepared by adding PET (7.5 mg, 300 μm) and DI $H_2O$ (5 mL) to an 8 mL vial. The mixture was vortex mixed at the 10/10 setting for 30 seconds. Adhesive coated beads (0.100 mg, ~10 beads) were added to the PS suspension and the sample was hand-shaken (3 shakes per second) for 1 min. The beads were transferred to a separate 8-mL vial and washed by adding 5 mL of DI $H_2O$, hand-shaking for 10 seconds, and removing the water using a needle and syringe. The beads were left to dry overnight and then analyzed using scanning electron microscopy (SEM).

A PS suspension in water (1.5 mg/mL) was prepared by adding PS latex (300 mg, 2.5% wt., 90 μm) and DI $H_2O$ (5 mL) to an 8 mL vial. The mixture was vortex mixed at the 10/10 setting for 30 seconds. Adhesive coated beads (0.100 mg, ~10 beads) were added to the PS suspension and the sample was hand-shaken (3 shakes per second) for 1 min. The beads were transferred to a separate 8-mL vial and washed by adding 5 mL of DI $H_2O$, hand-shaking for 10 seconds, and removing the water using a needle and syringe. The beads were left to dry overnight and then analyzed using scanning electron microscopy (SEM).

5.4.2 Comparing Performance of Adhesive Coated Beads Versus Glass Slides

Zirconium silicate beads (0.5 mm, 20.0 g) were added to a 40-mL vial and washed by adding 10-mL acetone and shaking for 30 seconds followed removing the solvent using a needle and syringe. The beads were spread onto aluminum foil and oven dried (120° C.) for 10 min. After cooling to ambient temperature, $PAA_{SPP\text{-}950k}$ (0.50 mL, 10% W/V.) was added and the beads were hand-shaken (3 shakes per second) for 2 min. The beads were dried under high vacuum for 3 h.

A stock PS suspension in water (50 mL, 0.38 mg/mL) was prepared by adding PS latex (760 mg, 2.5% wt., 90 μm) and DI $H_2O$ (50 mL) to a 50 mL centrifuge tube. The mixture was vortex mixed at the 10/10 setting for 30 seconds. The stock solution was vortex mixed at the 10/10 setting for 30 seconds before taking aliquots and stored in the refrigerator after each use.

To 8-mL vials containing PS suspension (3.5 mL, 0.38 mg/mL) was added adhesive coated beads (50 mg) followed by vortex mixing at the 10/10 setting for the appropriate time in duplicates (i.e., 0.5, 1.0, and 2 min). The beads were transferred to a separate 8-mL vial and washed by adding 5 mL of DI $H_2O$, hand-shaking for 10 seconds, and removing the water using a needle and syringe. The beads were left to air dry for 1 h and then analyzed using optical microscopy.

5.4.3 Effect of Time, Adhesive Molar Mass, and Microplastics Size on Removal Efficiency Two stock suspensions of PS (1 mg/mL) in aq. 20% EtOH was prepared by adding PS (40.1 mg, 10 μm), DI water (32 mL), and EtOH (8 mL) to 50 mL centrifuge tubes. The mixture was vortex mixed at 10 setting for 30 seconds and sonicated for 15 min.

Four types of adhesive coated beads ($PAA_{SPP\text{-}950k}$, $PAA_{Sigma\text{-}450k}$, $PAA_{P\&G\text{-}450k}$, and $PAA_{Sigma\text{-}92k}$) were prepared. Zirconium silicate beads (0.5 mm, 20.0 g) were added to a 20 mL vial and washed by adding 10 mL acetone and shaking for 30 seconds followed removing the solvent using a needle and syringe. The beads were spread onto aluminum foil and oven dried (120° C.) for 10 min. After cooling to ambient temperature, adhesive solution, (1.0 mL, 5% w/v.) was added and the beads were hand-shaken (3 shakes per second) for 2 min. The beads were dried under high vacuum for 3 h.

For each of the four adhesive types, four time points (0.5, 1, 3, and 5 min) and four replications (i.e., a, b, c, and d) for each time point were collected (i.e., 64 samples). Adhesive coated beads were added to sixty-four 4 mL vials, which were labeled accordingly. One colleague performed the hand-shaking on all "2" and "3" samples while the investigator did the "1" and "4" samples. Before transferring each aliquot, the stock solution was hand-shaken (3 shakes per second) for 10 s to maintain a homogenous suspension. Each sample was only aliquoted right before the hand-shaking cycles.

To four 4-mL vials containing adhesive-coated beads, PS suspension (1 mL) was added using a syringe. After shaking for the appropriate amount of time, a needle and syringe was used to transfer the suspensions into 1.5-mL Eppendorf's tubes and stored in the refrigerator.

5.5 Summary

In summary, it was fortuitously discovered that pressure-sensitive adhesives efficiently captured micronized rubber in a liquid waste container. This result was confirmed using other microplastics including polystyrene, polyethylene terephthalate, and nylon. Intrigued by the preliminary results, microplastics removal efficiency using poly(2-EHA) adhesives spanning 92-950 kg/mol coated onto zirconium silicate beads was explored. The lowest molar mass adhesive, Sigma-92k dominated microplastics removal efficiency by removing 81% within 30 s, whereas the other adhesives removed 50-59%. Ultimately, the removal efficiencies for Sigma-92k, P&G-450k, Sigma-450k, and SPP-950k were 99, 99, 92, and 96%, respectively. Although Sigma-92k exhibited the best microplastics removal kinetics, it is suspected that Sigma-92k suffered adhesive peeling, which introduced new microplastics. Although low molar mass improved microplastics removal kinetics, adhesive peeling may occur due to lack of cohesion.

Example 6

Representative Pressure Sensitive Adhesives

Various PSA chemical structures are suitable for use in the presently disclosed methods and articles. Representative PSA chemical structures and methods for their synthesis are shown in Scheme V.

Scheme V. Synthesizing pressure-sensitive adhesives with targeted surface energy parameters using acid-catalyzed esterification.

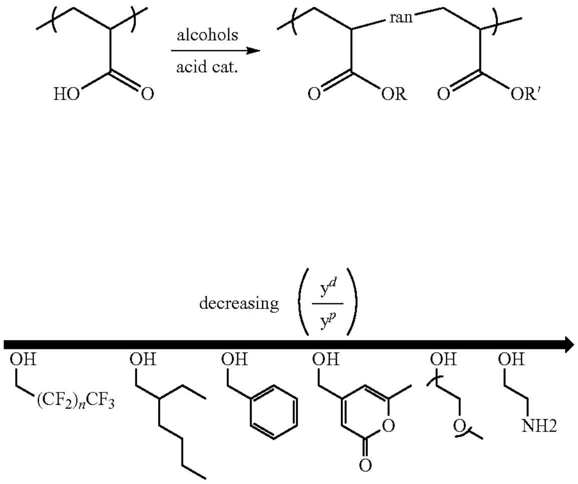

Surface energy (γ) plays a crucial role in capturing MPs underwater. More specifically, stronger adhesion between a PSA and a substrate is achieved when the polar ($\gamma^p$) and dispersive ($\gamma^d$) components ($\gamma^d/\gamma^p$) of surface energy are similar between the two materials. KRUSS Scientific. 2021. In support of this hypothesis, though not directly stated, Tiu, 2019, and Clancy, 2016, demonstrated that adhesives poly (2-ethylhexyl acrylate) adhesive containing benzyl groups significantly improved the adhesion to a steel substrate underwater. An increase in the polar component conferred by the incorporated benzyl groups likely improved adhesion, thereby making the ($\gamma^d/\gamma^p$) between the steel and PSA more comparable.

This concept also can be used to improve the interactions between the adhesive and substrates (e.g., zirconium silicate) used to capture MPs, which will most likely reduce adhesive peeling—even for the low molar mass PSAs (e.g., <400 kg/mol). For example, an esterification method can be used to synthesize poly(2-ethylhexyl acrylate) modified with other functionalities (e.g., benzyl, per-fluoro, and polyethylene oxide).

In certain embodiments, the PSA comprises a polymer selected from the group consisting of:

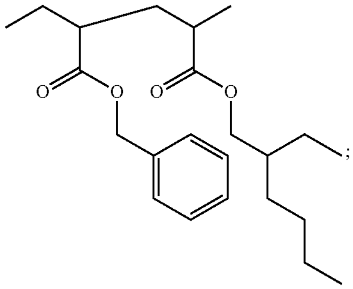
;

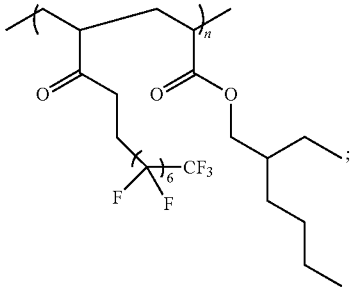
;

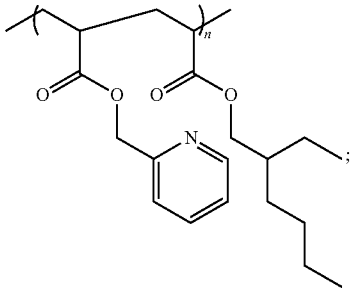
;

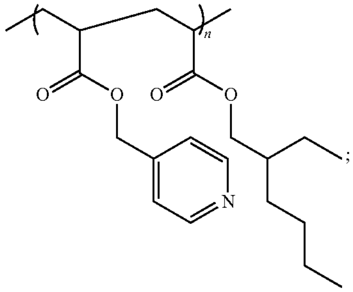
;

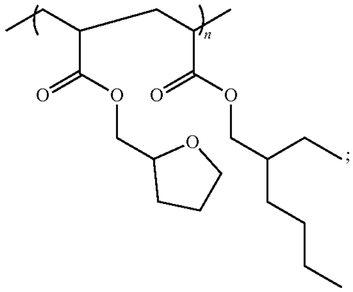
;

-continued

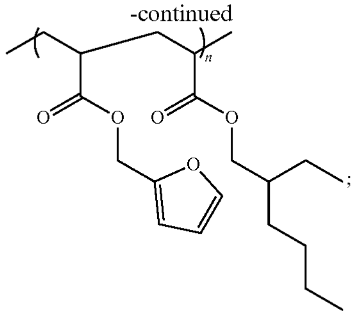

;

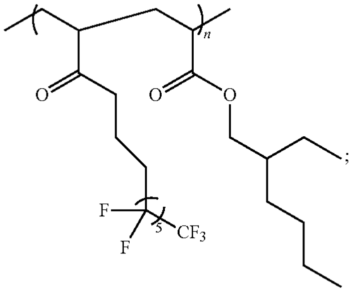

; and

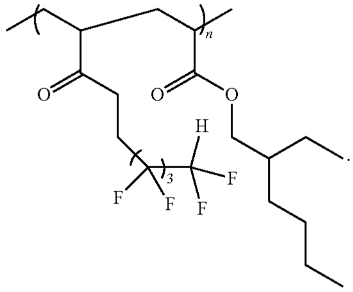

.

Example 7

Effect of Surfactant on Microplastics Removal

Further studies also explored MPs removal in surfactant (i.e., sodium dodecyl sulfate) with concentrations spanning 0.01-0.1% w/v. The MPs removal efficiency was evaluated based on MPs coverage on the glass slides, which were analyzed using optical microscopy (FIG. 21A). The results suggested that MPs removal is not negatively affected by sodium dodecyl sulfate (SDS). In fact, adding surfactant actually increased MPs coverage increased over 50%. Without wishing to be bound to any one particular theory, plasticization of the adhesive surface by the small surfactant molecules, which improves tack, is a potential explanation if SDS truly enhances MPs removal efficiency.

This hypothesis can be confirmed by running the same experiment using a polymeric surfactant (e.g., high molar mass polyvinyl alcohol), which is less likely to act as a plasticizer.

In this Example, a stock dispersion of PS in DI $H_2O$ (5 mg/mL) was prepared by adding PS (200 mg, 40 μm) and DI water (40 mL) to a 50-mL centrifuge tube. The mixture was vortex mixed at 10/10 setting for 30 seconds and sonicated for 5 min. While handshaking (3 shakes per second) for 10 s between aliquot transfers, aliquots (2 mL) were transferred into four 8 mL vials, which were subsequently used in MPs removal experiments.

In a 4-mL vial, sodium dodecyl sulfate (SDS, 20 mg) was dissolved with DI $H_2O$ (1.0 mL) to make a 2.0% w/v stock solution. Serial dilutions were performed to make a 1.0% (500 μL of 2.0% solution plus 500 μL of DI $H_2O$) and 0.2% (100 μL of 1.0% solution plus 400 μL of DI $H_2O$). To prepare samples with varying concentrations of surfactant (e.g., 0.10%, 0.05%, and 0.01% w/v), 100 μL of the 2.0%, 1.0%, and 0.20% w/v surfactant solutions were added to the 2 mL MPs suspensions.

10% w/v solutions in THF of $P(2\text{-EHA})_{P\&G\_780k}$ were prepared and used for MPs removal. Onto each glass substrate (0.8×20 mm), a droplet (10 μL) of adhesive was dispensed using a micropipette (FIG. 22). The THF was allowed to evaporate for 2 minutes under ambient conditions and then further dried at 125° C. in the oven for 2 min. The slides were left to cool to ambient temperature for about 5 min.

For MPs removal, the adhesive-coated glass slide was dropped into the 8 mL containing the microplastics dispersion and immediately vortex mixed at the 6/10 setting for 1 min. Afterwards, the glass slide was washed with DI water and then left to air dry for 20 min. The slides were analyzed by taking optical microscopic images of the center of each spot. See FIG. 23.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

REFERENCES

All publications, patent applications, patents, and other references mentioned in the specification are indicative of the level of those skilled in the art to which the presently disclosed subject matter pertains. All publications, patent applications, patents, and other references are herein incorporated by reference to the same extent as if each individual publication, patent application, patent, and other reference was specifically and individually indicated to be incorporated by reference. It will be understood that, although a number of patent applications, patents, and other references are referred to herein, such reference does not constitute an admission that any of these documents forms part of the common general knowledge in the art.

Agirre, A.; Nase, J.; Degrandi, E.; Creton, C.; Asua, J. M. Improving Adhesion of Acrylic Waterborne PSAs to Low Surface Energy Materials: Introduction of Stearyl Acrylate. J. Polym. Sci. Part A Polym. Chem. 2010, 48, 5030-5039.

Arena, U.; Ardolino, F.; Di Gregorio, F. Technological, Environmental and Social Aspects of a Recycling Process of Post-Consumer Absorbent Hygiene Products. J. Clean. Prod. 2016, 127, 289-301.

Barnes, D. K. A.; Galgani, F.; Thompson, R. C.; Barlaz, M. Accumulation and Fragmentation of Plastic Debris in Global Environments. Philos. Trans. R. Soc. B Biol. Sci. 2009, 364 (1526), 1985-1998.

Belzagui, F.; Crespi, M.; Alvarez, A.; Gutierrez-Bouzan, C.; Vilaseca, M. Microplastics' Emissions: Microfibers' Detachment from Textile Garments. Environ. Pollut. 2019, 284, 1028-1035.

Bergmann, M.; Mutzel, S.; Primpke, S.; Tekman, M. B.; Trachsel, J.; Gerdts, G. White and Wonderful? Microplastics Prevail in Snow from the Alps to the Arctic. Sci. Adv. 2019, 5, eaax1157.

Bio-Rad. Hemocytometer vs. Automated Cell Counter. www.bio-rad.com/featured/en/hemocytometer.html (accessed Jun. 14, 2021).

Chang, E. P. Viscoelastic Windows of Pressure-Sensitive Adhesives. J. Adhes. 1991, 34 (1-4), 189-200.

Chemistry LibreTexts. 2021. Raja, P. M. V; Barron, A. R. UV-Visible Spectroscopy. chem.libretexts.org/@go/page/55881 (accessed Jun. 13, 2021).

Chen, Y.-J.; Chen, Y.; Miao, C.; Wang, Y.-R.; Gao, G.-K.; Yang, R.-X.; Zhu, H.-J.; Wang, J.-H.; Li, S.-L.; Lan, Y.-Q. Metal—Organic Framework-Based Foams for Efficient Microplastics Removal. J. Mater. Chem. A 2020, 8 (29), 14644-14652.

Clancy, S. K.; Sodano, A.; Cunningham, D. J.; Huang, S. S.; Zalicki, P. J.; Shin, S.; Ahn, B. K. Marine Bioinspired Underwater Contact Adhesion. Biomacromolecules 2016, 17 (5), 1869-1874.

Collias et al., U.S. Patent Application Publication No. 20210054161 for Depolymerization of Polymers, published Feb. 25, 2021.

Collias et al., WO2021041326 for Super Absorbent Polymer Recycling to Pressure Sensitive Adhesives, published Mar. 4, 2021.

Collias et al., U.S. Patent Application Publication No. 20210054248 for Super Absorbent Polymer Recycling to Pressure Sensitive Adhesives, published Aug. 24, 2020.

Colson, B. C.; Michel, A. P. M. Flow-Through Quantification of Microplastics Using Impedance Spectroscopy. ACS Sensors 2021, 6 (1), 238-244.

Cox, K. D.; Covernton, G. A.; Davies, H. L; Dower, J. F.; Juanes, F; Dudas, S. E. Human Consumption of Microplastics. Environ. Sci. Technol. 2019, 53, 7068-7074.

Creton, C. Pressure-Sensitive Adhesives: An Introductory Course. MRS Bull. 2003, 28 (6), 434-439.

De Falco, F.; Di Pace, E.; Cocca, M.; Avella, M. The Contribution of Washing Processes of Synthetic Clothes to Microplastic Pollution. Sci. Rep. 2019, 9 (1), 6633.

European Basic Acrylate Manufacturers. Eco-profiles and Environmental Product Declarations of the European Plastics Manufacturers https://www.petrochemistry.eu/wp-content/uploads/2018/01/150727 EBAM-Eco-profile-Acrylic-Monomers-1.pdf.

Fowkes, F. M. Determination of Interfacial Tensions, Contact Angles, and Dispersion Forces in Surfaces by Assuming Additivity of Intermolecular Interactions in Surfaces. J. Phys. Chem. 1962, 66, 382-382.

Future Market Insights. Super Absorbent Polymer Market: Global Industry Analysis and Opportunity Assessment 2015-2020 https://www.futuremarketinsights.com/reports/super-absorbent-polymer-market.

Geyer, R.; Jambeck, J. R.; Law, K. L. Production, Uses, and Fate of All Plastics Ever Made. Sci. Adv. 2017, 3 (7), 5.

Hernandez, E.; Nowack, B.; Mitrano, D. M. Polyester Textiles as a Source of Microplastics from Households: A Mechanistic Study to Understand Microfiber Release During Washing. Environ. Sci. Technol. 2017, 51, 7036-7046.

Hong, M.; Chen, E. Y.-X. Chemically Recyclable Polymers: A Circular Economy Approach to Sustainability. Green Chem. 2017, 19 (16), 3692-3706.

Jaroszeski, M. J.; Radcliff, G. Fundamentals of Flow Cytometry. Mol. Biotechnol. 1999, 11 (1), 37-53.

Kaile, N.; Lindivat, M.; Elio, J.; Thuestad, G.; Crowley, Q. G.; Hoell, I. A. Preliminary Results From Detection of Microplastics in Liquid Samples Using Flow Cytometry. Front. Mar. Sci. 2020, 7.

Karnal, P.; Jha, A.; Wen, H.; Gryska, S.; Barrios, C.; Frechette, J. Contribution of Surface Energy to PH-Dependent Underwater Adhesion of an Acrylic Pressure-Sensitive Adhesive. Langmuir 2019, 35 (15), 5151-5161.

Karnal, P.; Roberts, P.; Gryska, S.; King, C.; Barrios, C.; Frechette, J. Importance of Substrate Functionality on the Adhesion and Debonding of a Pressure-Sensitive Adhesive under Water. ACS Appl. Mater. Interfaces 2017, 9, 42344-42353.

Kenney, J. F.; Haddock, T. H.; Sun, R. L.; Parreira, H. C. Medical-Grade Acrylic Adhesives for Skin Contact. J. Appl. Polym. Sci. 1992, 45 (2), 355-361.

Mason, S. A.; Garneau, D.; Sutton, R.; Chu, Y.; Ehmann, K.; Barnes, J.; Fink, P.; Papazissimos, D.; Rogers, D. L. Microplastic Pollution is Widely Detected in US Municipal Wastewater Treatment Plant Effluent. Environ. Pollut. 2016, 218, 1045-1054.

McDevitt, J. P.; Criddle, C. S.; Morse, M.; Hale, R. C.; Bott, C. B.; Rochman, C. M. Addressing the Issue of Microplastics in the Wake of the Microbead-Free Waters Act—A New Standard can Facilitate Improved Policy. Environ. Sci. Technol. 2017, 51, 6611-6617.

McNeil, A. J.; Chazovachii, P. T.; Robo, M. T.; Marsh, N. G.; Zimmerman, P. M.; James, M. I.; Collias, D. I. Esterifying Polyacrylic Acid with High Conversion. U.S. Provisional Patent Application 62/947,363, 2019.

Mitzel, M. R.; Sand, S.; Whalen, J. K.; Tufenkji, N. Hydrophobicity of Biofilm Coatings Influences the Transport Dynamics of Polystyrene Nanoparticles in Biofilm-Coated Sand. Water Res. 2016, 92, 113-120.

Novotna, K.; Cermakova, L.; Pivokonska, L.; Cajthaml, T.; Pivokonsky, M. Microplastics in Drinking Water Treatment—Current Knowledge and Research Needs. Sci. Total Environ. 2019, 667, 730-740.

O'Connor, A. E.; Willenbacher, N. The Effect of Molecular Weight and Temperature on Tack Properties of Model Polyisobutylenes. Int. J. Adhes. Adhes. 2004, 24 (4), 335-346.

Owens, D. K.; Wendt, R. C. Estimation of the Surface Free Energy of Polymers. J. Appl. Polym. Sci. 1969, 13, 1741-1747.

Peller, J. R.; Eberhardt, L.; Clark, R.; Nelson, C.; Kostelnik, E.; Iceman, C. Tracking the Distribution of Microfiber Pollution in a Southern Lake Michigan Watershed through the Analysis of Water, Sediment and Air. Environ. Sci. Process. Impacts 2019, 21 (9), 1549-1559.
Peng, X.; Chen, M.; Chen, S.; Dasgupta, S.; Xu, H.; Ta, K.; Du, M.; Li, J.; Guo, Z.; Bai, S. Microplastics Contaminate the Deepest Part of the World's Ocean. Geochem. Persp. Let. 2018, 9, 1-5.
Pocious, A. V. Adhesion and Adhesives Technology, 2nd ed.; Carl Hanser Verlag: Munchen, 2002.
Roe, R.-J. Parachor and Surface Tension of Amorphous Polymers. J. Phys. Chem. 1965, 69, 2809-2810.
Somma, M.; Vaccaro, G.; Michalek, J. K.; Thomas, T. Apparatus and Process for Sterilising Absorbent Sanitary Products. EP2596811 (B1) (2014).
Somma, M.; Vaccaro, G.; Michalek, J. K.; Thomas, T. Method for Sterilisation of Used Absorbent Sanitary Products. EP 2596810 (Al) (2013).
Sugden, S. CXLII.—A Relation between Surface Tension, Density, and Chemical Composition. J. Chem. Soc., Trans. 1924, 125, 1177-1189.
Tiu, B. D. B.; Delparastan, P.; Ney, M. R.; Gerst, M.; Messersmith, P. B. Enhanced Adhesion and Cohesion of Bioinspired Dry/Wet Pressure-Sensitive Adhesives. ACS Appl. Mater. Interfaces 2019, 11 (31), 28296-28306.
Tobing, S. D.; Klein, A. Molecular Parameters and Their Relation to the Adhesive Performance of Acrylic Pressure-Sensitive Adhesives. J. Appl. Polym. Sci. 2001, 79 (12),
U.S. Pat. No. 2,917,538 for Process for the Production of Acrylic Acid Esters, to Carlyle, issued Dec. 15, 1959.
U.S. Pat. No. 9,822,286 for Self-Wetting Adhesive Composition, to Fornof et al., Nov. 21, 2017.
Van Oss, C.; Good, R.; Chaudhury, M. The Role of van der Waals Forces and Hydrogen Bonds in "Hydrophobic Interactions" between Biopolymers and Low Energy Surfaces. J. Colloid Interface Sci. 1986, 111, 378-390.
Waite, J. H. Adhesion in Byssally Attached Bivalves. Biol. Rev. 1983, 58 (2), 209-231.
Xu, X.; Hou, Q.; Xue, Y.; Jian, Y.; Wang, L. Pollution Characteristics and Fate of Microfibers in the Wastewater from Textile Dyeing Wastewater Treatment Plant. Water Sci. Technol. 2018, 78, 2046-2054.
Yang, L.; Qiao, F.; Lei, K.; Li, H.; Kang, Y.; Cui, S.; An, L. Microfiber Release from Different Fabrics during Washing. Environ. Pollut. 2019, 249, 136-143.
Zhang, Q.; Qu, Q.; Lu, T.; Ke, M.; Zhu, Y.; Zhang, M.; Zhang, Z.; Du, B.; Pan, X.; Sun, L.; et al. The Combined Toxicity Effect of Nanoplastics and Glyphosate on Microcystis *Aeruginosa* Growth. Environ. Pollut. 2018, 243, 1106-1112.
Zhu, X.; Nguyen, B.; You, J. B; Karakolis, E.; Sinton, D.; Rochman, C. Identification of Microfibers in the Environment Using Multiple Lines of Evidence. Environ. Sci. Technol. 2019, 53, 11877-11887.

Although the foregoing subject matter has been described in some detail by way of illustration and example for purposes of clarity of understanding, it will be understood by those skilled in the art that certain changes and modifications can be practiced within the scope of the appended claims.

What is claimed is:

1. A method for removing micro- or nanoplastic particles from a medium, the method comprising contacting the micro- or nanoplastic particles in the medium with an article comprising one or more pressure-sensitive adhesives, wherein the one or more pressure-sensitive adhesives comprise a compound of formula (I) or formula (II):

(I)

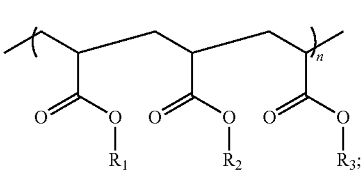

or (II)

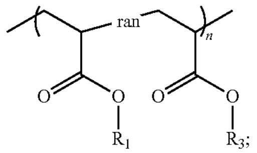

wherein:

each n is independently an integer from 1 to 10,000;

each $R^1$, $R^2$, and $R^3$, if present, is independently selected from the group consisting of:

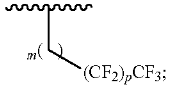
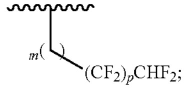
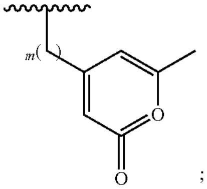
;
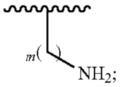
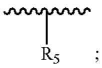
;
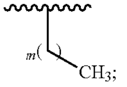
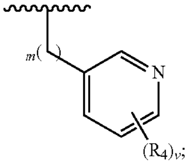
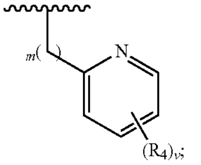
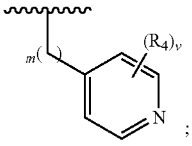
;
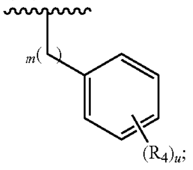
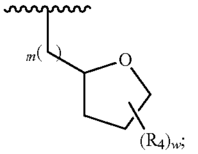
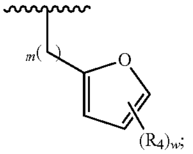
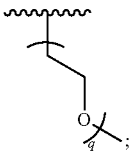
; and
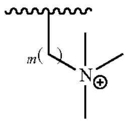
;

wherein:

each m is independently an integer selected from the group consisting of 1, 2, 3, 4, 5, 6, 7, and 8;

p and q are each independently an integer selected from the group consisting of 1, 2, 3, 4, 5, 6, 7, and 8;

u is an integer selected from the group consisting of 1, 2, 3, 4, and 5;

v is an integer selected from the group consisting of 1, 2, 3, and 4;

w is an integer selected from the group consisting of 1, 2, and 3;

each $R_4$ is independently selected from the group consisting of H, $C_1$-$C_8$ substituted or unsubstituted branched or straight-chain alkyl, hydroxyl, $C_1$-$C_8$alkoxyl, amino, cyano, —$CF_3$, carbonyl, carboxyl, $C_1$-$C_8$ alkynyl, acyl, carbamoyl, halogen, nitro, mercapto, and thiol; and $R_5$ is a $C_3$-$C_{20}$ branched alkyl.

2. The method of claim 1, wherein $R_1$, $R_2$, and $R_3$, if present, are each independently selected from the group consisting of:

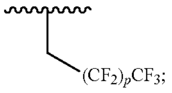 ; 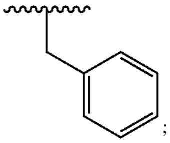 ; 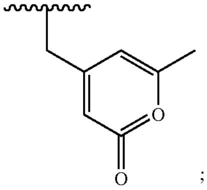 ;

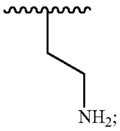 ; 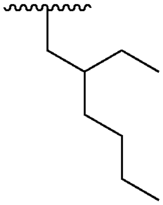 ; 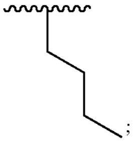 ;

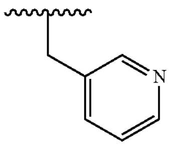 ; 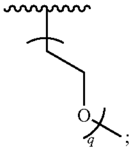 ; 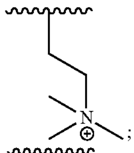 ;

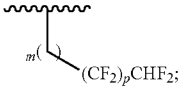 ; 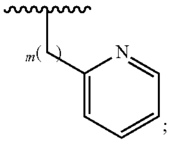 ; 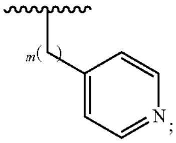 ;

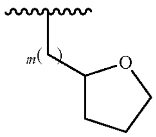 ; and 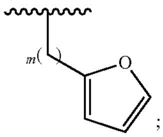 ;

wherein p and q are each independently integers selected from the group consisting of 1, 2, 3, 4, 5, 6, 7, and 8.

3. The method of claim 1, wherein the pressure sensitive adhesive is made from a recycled superabsorbent polymer (SAP).

4. The method of claim 3, wherein the recycled SAP is degraded to poly (acrylic acid) (PAA); and wherein the PAA is derivatized to the pressure sensitive adhesive.

5. The method of claim 1, wherein the micro-or nano-plastic particles comprise a material selected from the group consisting of rubber, poly (isoprene), polyamide, polyester, poly (ethylene), poly (propylene), polystyrene, nylon, cellulose, poly (ethylene terephthalate), polyvinylfluoride (PVF), polyvinylidene fluoride (PVDF), poly (tetrafluoroethylene) (PTFE), polychlorotrifluoroethylene (PCTFE), perfluoroalkoxy alkane (PFA), fluorinated ethylene propylene (FEP), polyethylenetetrafluoroethylene (ETFE), polyethylenechlorotrifluoroethylene (ECTFE), perfluorinated elastomer (FFPM/FFKM), chlorotrifluoroethylenevinylidene fluoride (FPM/FKM), tetrafluoroethylene-propylene (FEPM), perfluoropolyether (PFPE), perfluorosulfonic acid (PFSA), perfluoropolyoxetane, and combinations thereof.

6. The method of claim 1, wherein the medium is selected from the group consisting of an aqueous medium and an atmospheric medium.

7. The method of claim 6, wherein the aqueous medium is selected from the group consisting of wastewater effluent from a wastewater treatment plant, laundry effluent from a commercial laundry facility, laundry effluent from a personal washing machine, and fill water in a washing machine during or after a washing cycle.

8. The method of claim 4, wherein the atmospheric environment is selected from the group consisting of indoor air, outdoor air, and the emissions, exhaust, and/or vent of a commercial or personal clothes dryer.

9. The method of claim 1, further comprising removing the micro- or nanoplastic particles from the one or more pressure-sensitive adhesives.

* * * * *